United States Patent
Ashworth et al.

(10) Patent No.: US 10,879,996 B2
(45) Date of Patent: Dec. 29, 2020

(54) FEEDBACK CANCELLATION ON MULTIBAND BOOSTER

(71) Applicant: Wilson Electronics, LLC, St. George, UT (US)

(72) Inventors: Christopher Ken Ashworth, St. George, UT (US); Dale Robert Anderson, Colleyville, TX (US); Ilesh V. Patel, Euless, TX (US); Glen Raggio, Mesquite, TX (US)

(73) Assignee: Wilson Electronics, LLC, St. George, UT (US)

( * ) Notice: Subject to any disclaimer, the term of this patent is extended or adjusted under 35 U.S.C. 154(b) by 77 days.

(21) Appl. No.: 16/425,852

(22) Filed: May 29, 2019

(65) Prior Publication Data

US 2019/0312631 A1    Oct. 10, 2019

Related U.S. Application Data

(63) Continuation of application No. 16/374,660, filed on Apr. 3, 2019.

(60) Provisional application No. 62/737,758, filed on Sep. 27, 2018, provisional application No. 62/655,735, filed on Apr. 10, 2018.

(51) Int. Cl.
  *H04B 7/155* (2006.01)
  *H04B 1/525* (2015.01)
  *H04L 5/14* (2006.01)

(52) U.S. Cl.
  CPC ......... *H04B 7/15585* (2013.01); *H04B 1/525* (2013.01); *H04L 5/1423* (2013.01)

(58) Field of Classification Search
  CPC .. H04B 1/0057; H04B 1/0064; H04B 1/3877; H04B 1/52; H04B 7/15528; H04B 7/15535; H04B 7/15542; H04W 16/26
  See application file for complete search history.

(56) References Cited

U.S. PATENT DOCUMENTS

| | | | | |
|---|---|---|---|---|
| 6,374,119 | B1 * | 4/2002 | Jun | H04B 7/2606 455/11.1 |
| 2003/0236067 | A1 * | 12/2003 | Hasarchi | H03H 17/0294 455/10 |
| 2004/0157551 | A1 * | 8/2004 | Gainey | H04B 7/15528 455/11.1 |
| 2004/0166802 | A1 * | 8/2004 | McKay, Sr. | H04B 7/1555 455/15 |

(Continued)

*Primary Examiner* — David Bilodeau
(74) *Attorney, Agent, or Firm* — Thorpe North & Western

(57) ABSTRACT

A technology is described for feedback cancellation in a multiband booster. The repeater can comprise: a server antenna port; a donor antenna port; a first direction amplification and filtering path coupled between the server antenna port and the donor antenna port; a second direction amplification and filtering path coupled between the server antenna port and the donor antenna port; a first-direction two-antenna feedback cancellation circuit coupled between the server antenna port and the donor antenna port to reduce antenna-to-antenna feedback for a single band in a first direction between a donor antenna and a server antenna; and a second-direction two-antenna feedback cancellation circuit coupled between the server antenna port and the donor antenna port to reduce antenna-to-antenna feedback for the single band in a second direction between the donor antenna and the server antenna.

27 Claims, 23 Drawing Sheets

(56) References Cited

U.S. PATENT DOCUMENTS

| | | | |
|---|---|---|---|
| 2005/0215204 A1* | 9/2005 | Wallace | H04B 1/1036 455/78 |
| 2006/0019603 A1* | 1/2006 | Pergal | H04B 7/15585 455/15 |
| 2006/0019604 A1* | 1/2006 | Hasarchi | H04B 7/15542 455/15 |
| 2006/0205342 A1* | 9/2006 | McKay, Sr. | H04B 3/36 455/11.1 |
| 2008/0161076 A1* | 7/2008 | Min | H04M 1/72527 455/575.7 |
| 2009/0181735 A1* | 7/2009 | Griffin, Jr. | H01O 25/00 455/575.7 |
| 2009/0270027 A1* | 10/2009 | O'Neill | H04B 7/2606 455/15 |
| 2011/0176635 A1* | 7/2011 | Hochwald | H04L 5/0023 375/299 |
| 2012/0027054 A1* | 2/2012 | Palanki | H04B 7/155 375/211 |
| 2013/0157720 A1* | 6/2013 | Schiff | H04B 7/15535 455/561 |
| 2014/0065949 A1* | 3/2014 | Wilhite | H04B 1/745 455/8 |
| 2014/0266424 A1* | 9/2014 | Ashworth | H03F 1/0277 330/84 |
| 2014/0273816 A1* | 9/2014 | Ashworth | H04B 7/15 455/15 |
| 2015/0009889 A1* | 1/2015 | Zhan | H04B 7/15542 370/315 |
| 2015/0011157 A1* | 1/2015 | Terry | H04B 7/15535 455/10 |
| 2016/0308276 A1* | 10/2016 | Chang | H01O 3/24 |

* cited by examiner

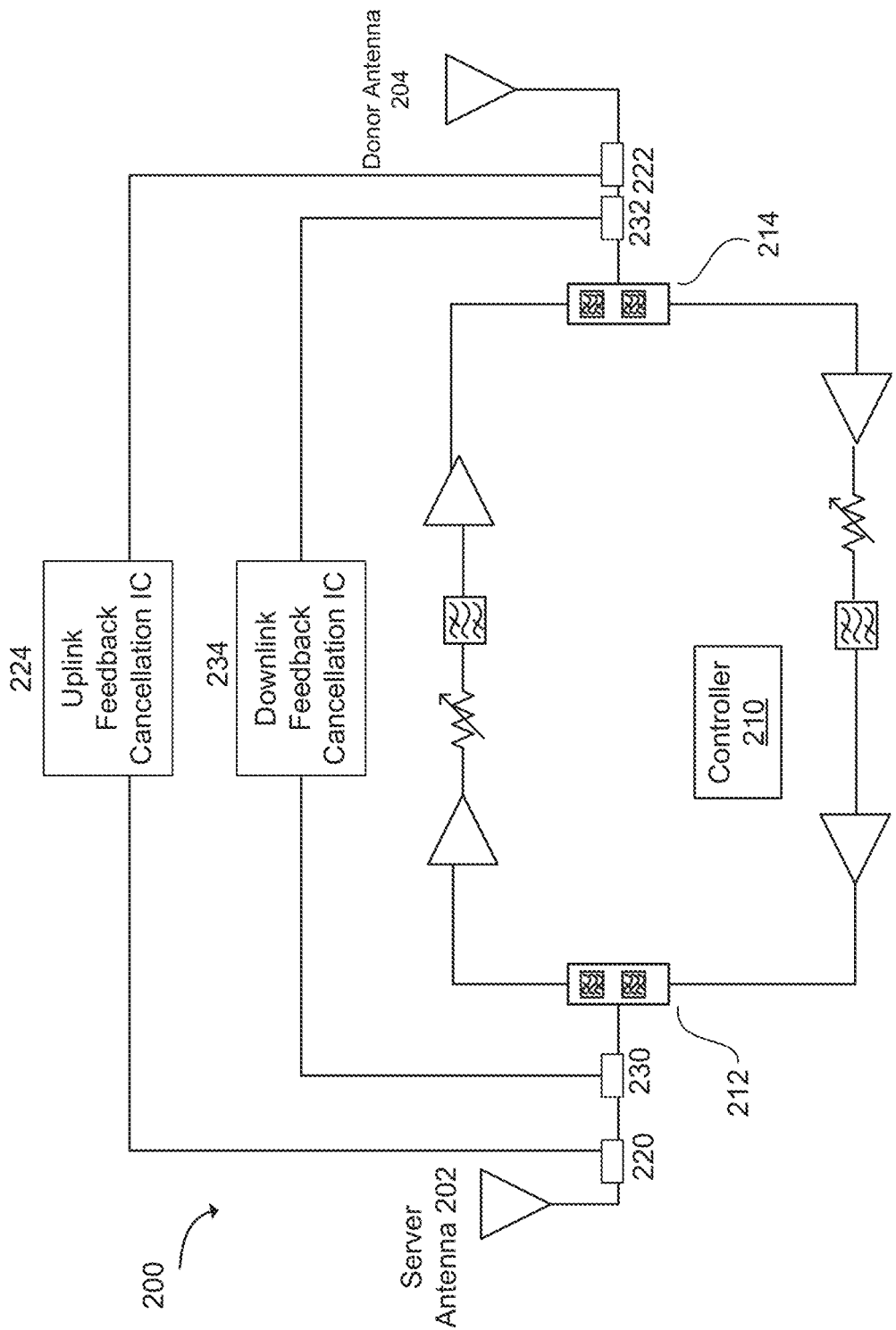

FEEDBACK CANCELLATION ON MULTIBAND BOOSTER

RELATED APPLICATIONS

The present application is a continuation of U.S. patent application Ser. No. 16/374,660 filed Apr. 3, 2019, which claims the benefit of U.S. Provisional Patent Application No. 62/655,735 filed Apr. 10, 2018 and U.S. Provisional Patent Application No. 62/737,758 filed Sep. 27, 2018, the entire specifications of which are hereby incorporated by reference in their entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates a bi-directional repeater with feedback cancellation in accordance with an example;

Figure 1A:
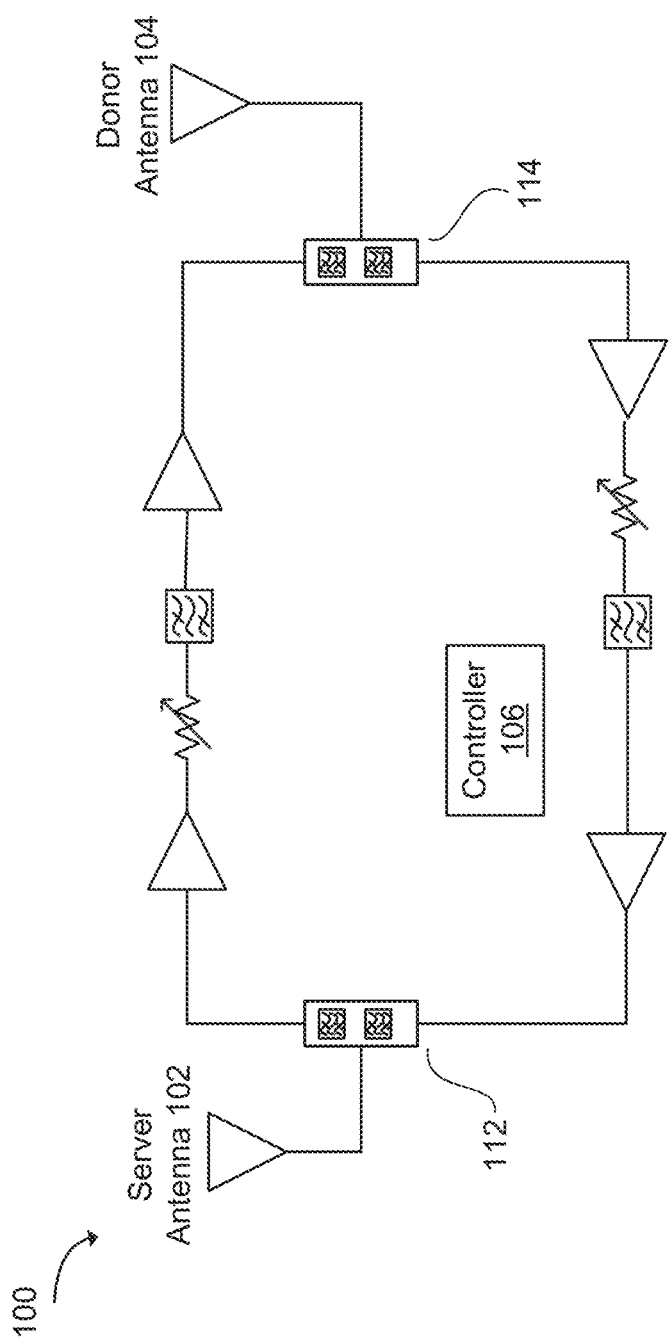
FIG. 1a illustrates a bi-directional repeater in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In an example, as illustrated in FIG. 1a, a bi-directional repeater system can comprise a repeater 100 connected to an outside antenna 104 or donor antenna 104 and an inside antenna 102 or server antenna 102. The repeater 100 can include a donor antenna port that can be internally coupled to a second duplexer (or diplexer or multiplexer or circulator or splitter) 114. The repeater 100 can include a server antenna port that can also be coupled to a first duplexer (or diplexer or multiplexer or circulator or splitter) 112. Between the two duplexers, 114 and 112, can be two paths: a first path and a second path. The first path can comprise a low noise amplifier (LNA) with an input coupled to the first duplexer 112, a variable attenuator coupled to an output of the LNA, a filter coupled to the variable attenuator, and a power amplifier (PA) coupled between the filter and the second duplexer 114. The LNA can amplify a lower power signal without degrading the signal to noise ratio. A PA can adjust and amplify the power level by a desired amount. A second path can comprise an LNA with an input coupled to the second duplexer 114, a variable attenuator coupled to an output of the LNA, a filter coupled to the variable attenuator, and a PA coupled between the filter and the first duplexer 112. The first path can be a downlink amplification path or an uplink amplification path. The second path can be a downlink amplification path or an uplink amplification path. The repeater 100 can also comprise a controller 106. In one example, the controller 106 can include one or more processors and memory.

Figure 1B:
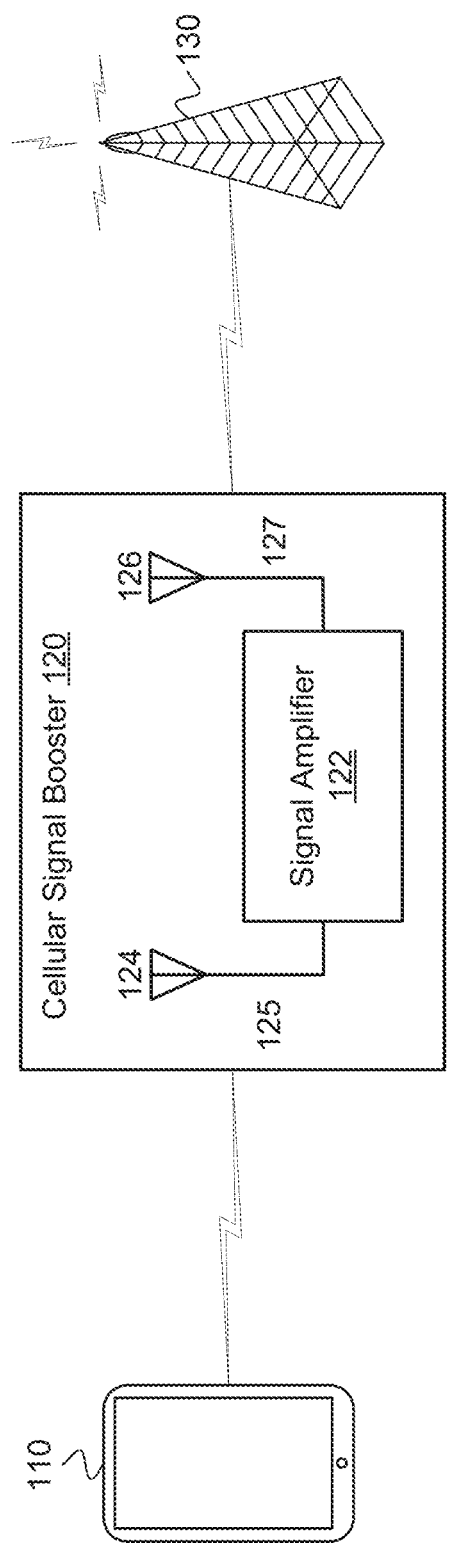
FIG. 1b illustrates a bi-directional repeater in communication with a user equipment (UE) and a base station (BS) in accordance with an example.

FIG. 1b illustrates an exemplary signal booster 120 in communication with a wireless device 110 and a base station 130. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to a node, such as base station 130.

In one example, the signal booster 120 can send uplink signals to a node and/or receive downlink signals from the node. While FIG. 1b shows the node as a base station 130, this is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve may be attached to the wireless device 110, but may be removed as needed. In this configuration, the signal booster 120 can automatically power down or cease amplification when the wireless device 110 approaches a particular base station. In other words, the signal booster 120 may determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in 47 CFR Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15, or 16 standards, 3GPP Fifth Generation (5G) Release 15 or 16, or Institute of Electronics and Electrical Engineers (IEEE) 802.16. In one configuration, the signal booster 120 can boost signals for 3GPP LTE Release 16.0.0 (January 2019) or other desired releases. The signal booster 120 can boost signals from the 3GPP Technical Specification (TS) 36.101 (Release 16 Jan. 2019) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-85 or other bands, as disclosed in 3GPP TS 36 104 V16.0.0 (2019-01).

In another configuration, the signal booster 120 can boost signals from the 3GPP Technical Specification (TS) 38.104 (Release 15 Jan. 2019) bands or 5G frequency bands. In addition, the signal booster 120 can boost selected frequency bands based on the country or region in which the signal booster is used, including any of bands n1-n86, n257-n261, or other bands, as disclosed in 3GPP TS 38.104 V15.4.0 (January 2019).

The typical architecture of a repeater can result in two undesired types of feedback. One type of feedback is internal loop feedback between the uplink path and the downlink path. A second type of feedback is over the air feedback between the donor antenna and the server antenna. The over the air feedback between the two antennas can be difficult to cancel because the feedback is typically a wideband signal. The donor antenna (or outside antenna) and the server antenna (or inside antenna), when positioned too close to each other, can result in oscillation due to antenna to antenna feedback. This can occur when the gain of the repeater is greater than the path loss, antenna gain, and coax loss between the booster ports (common port of 112 and 114). One way of alleviating this problem is to use directional antennas in order to increase the path loss and isolate the antennas from each other. Another way is to increase the distance between the two antennas. However, it is often desirable to use omnidirectional antennas and/or to position the two antennas close together.

One way of addressing this problem is by using feedback cancellation from one antenna port to the other. The signal is coupled off of the transmitting port to a feedback cancellation integrated circuit (IC), the cancellation signal is generated, and then the cancellation signal is coupled onto the receiving port.

The typical architecture of a repeater can also result in weak near-far performance. A booster that channelizes a cellular band to apply selective filtering and attenuation to improve near-far performance can be difficult, complex, and expensive. One possible way to improve near-far performance is to channelize the cellular band by selective bandwidth cancelling of the signal path on both the uplink and downlink directions.

In another example, as illustrated in FIG. 2, a bi-directional repeater system can comprise a repeater 200 electrically connected to an outside antenna 204 or donor antenna 204 and an inside antenna 202 or server antenna 202. The repeater 200 can include a donor antenna port that can be internally coupled to a second duplexer (or diplexer or multiplexer or circulator or splitter) 214. The repeater 200 can include a server antenna port that can also be coupled to a first duplexer (or diplexer or multiplexer or circulator or splitter) 212. Between the two duplexers, 214 and 212, can be two paths: a first path and a second path. The first path can comprise a low noise amplifier (LNA) with an input coupled to the first duplexer 212, a variable attenuator coupled to an output of the LNA, a filter coupled to the variable attenuator, and a power amplifier (PA) coupled between the filter and the second duplexer 214. The LNA can amplify a lower power signal without degrading the signal to noise ratio. A PA can adjust and amplify the power level by a desired amount. A second path can comprise an LNA with an input coupled to the second duplexer 214, a variable attenuator coupled to an output of the LNA, a filter coupled to the variable attenuator, and a PA coupled between the filter and the first duplexer 212. The first path can be a downlink amplification path or an uplink amplification path. The second path can be a downlink amplification path or an uplink amplification path. The repeater 200 can also comprise a controller 210. In one example, the controller 210 can include one or more processors and memory.

The uplink insertion coupler 220 can feed the signal to an uplink feedback cancellation integrated circuit (IC) 224, and then a cancellation signal can be generated and coupled onto the uplink receiving coupler 222. Similarly, the downlink insertion coupler 232 can feed the signal to a downlink feedback cancellation integrated circuit (IC) 234, and then a cancellation signal can be generated and coupled onto the downlink receiving coupler 230.

Previous solutions are limited in the amount of bandwidth of the signal that can be canceled. As the bandwidth of the signal becomes greater, it can become more difficult to cancel the signal. Previous solutions could only cancel about 10 megahertz (MHz) of bandwidth, but a wideband multiband repeater can have hundreds of MHz in bandwidth. The feedback between the antennas is wideband feedback for cellular signal amplifiers. One example is Third Generation Partnership Project (3GPP) Band 25, which has an uplink passband from 1850-1915 MHz and a downlink passband from 1930-1995 MHz. Repeaters can have multiple bands all operating simultaneously such as 3GPP B5/12/13/25/66.

A wideband multiband bi-directional signal booster amplifier can have various architectures that can address the problem of antenna to antenna feedback (which is also known as the problem of antenna to antenna isolation), as well as problems associated with uplink-to-uplink feedback and downlink-to-downlink feedback.

Typically in a multiband booster, each band requires two separate feedback cancellation circuits—one for the uplink signal path and one for the downlink signal path. One example of the architecture can include an uneven number of uplink paths to downlink paths resulting in an uneven number of feedback cancelation circuits. The band 12 and band 13 uplink feedback cancellation circuits can each be separate because the uplink passbands are separate. However, the band 12 and band 13 downlink feedback cancellation circuits can be shared because band 12 and band 13 are spectrally adjacent. Another example of the architecture can include 9 or more feedback cancellation circuits in the case of a five-band signal booster or repeater.

Figure 3:
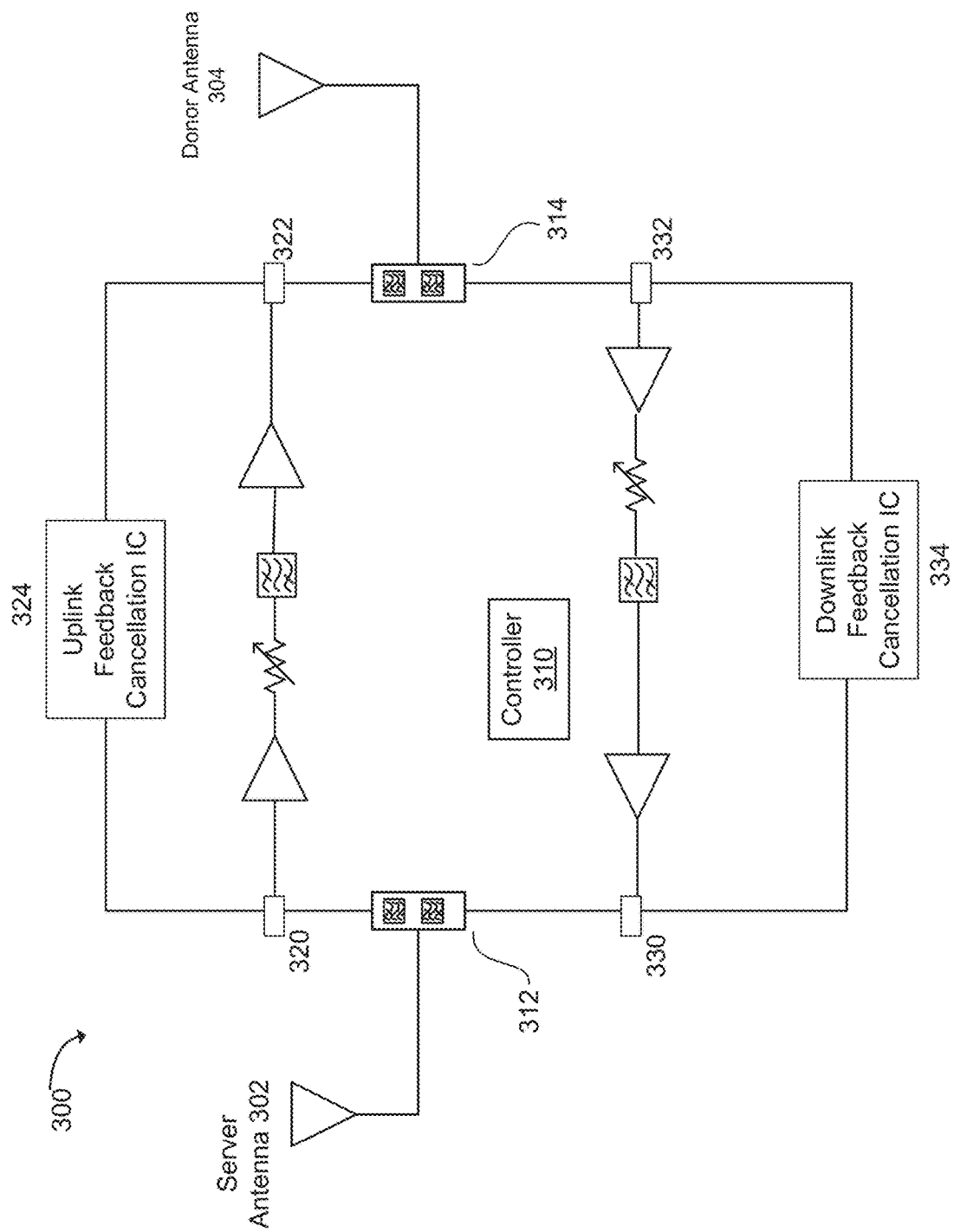
FIG. 3 illustrates a bi-directional repeater with feedback cancellation in accordance with an example.

In another example, as illustrated in FIG. 3, the architecture can include cancelling within the signal path rather than at the antenna ports. A bi-directional repeater system can comprise a repeater 300 connected to an outside antenna 304 or donor antenna 304 and an inside antenna 302 or server antenna 302. The repeater 300 can include a donor antenna port that can be internally coupled to a second duplexer (or diplexer or multiplexer or circulator or splitter) 314. The repeater 300 can include a server antenna port that can also be coupled to a first duplexer (or diplexer or multiplexer or circulator or splitter) 312. Between the two duplexers, 314 and 312, can be two paths: a first path and a second path. The first path can comprise a low noise amplifier (LNA) with an input coupled to the first duplexer 312, a variable attenuator coupled to an output of the LNA, a filter coupled to the variable attenuator, and a power amplifier (PA) coupled between the filter and the second duplexer 314. The LNA can amplify a lower power signal without degrading the signal to noise ratio. A PA can adjust and amplify the power level by a desired amount. A second path can comprise an LNA with an input coupled to the second duplexer 314, a variable attenuator coupled to an output of the LNA, a filter coupled to the variable attenuator, and a PA coupled between the filter and the first duplexer 312. The first path can be a downlink amplification path or an uplink amplification path. The second path can be a downlink amplification path or an uplink amplification path. The repeater 300 can also comprise a controller 310. In one example, the controller 310 can include one or more processors and memory.

In this example, the uplink and downlink feedback cancellation circuits can be positioned after the diplexer/duplexer/multiplexer/circulator/splitter of the repeater, within the signal path, instead of at the antenna ports. For example, the uplink insertion coupler 320 can feed the signal to an uplink feedback cancellation IC 324, then a cancellation signal can be generated and coupled onto the uplink receiving coupler 322. Similarly, the downlink insertion coupler 332 can feed the signal to a downlink feedback cancellation IC 334, then a cancellation signal can be generated and coupled onto the downlink receiving coupler 330.

It should be noted that the feedback cancellation used herein applies to radio frequency signals, rather than intermediate frequency (IF) or baseband signals. It is easier to use feedback cancellation in IF or baseband signals because there is less bandwidth.

Figure 4:
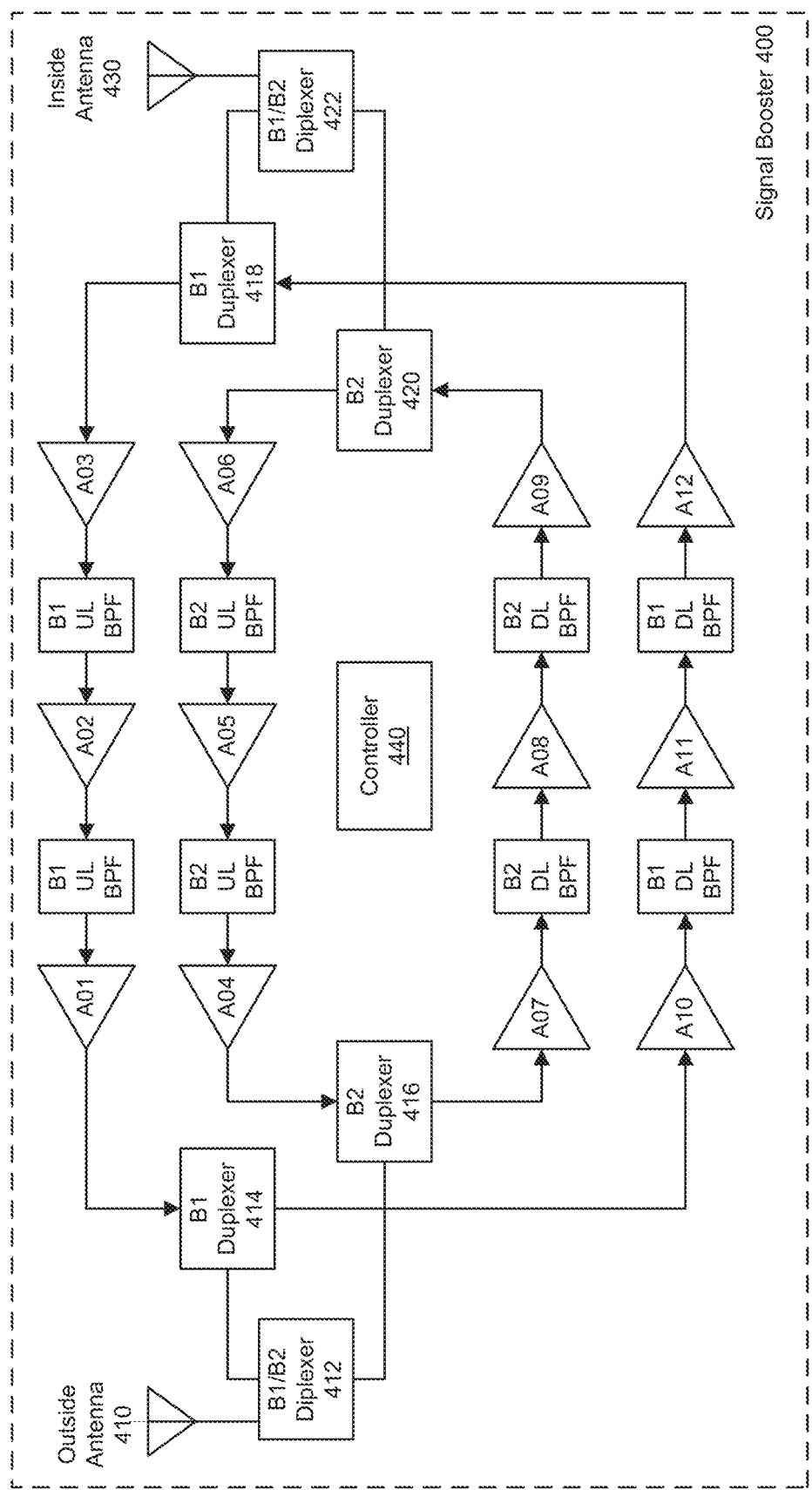
FIG. 4 illustrates a multiband bi-directional wireless signal booster in accordance with an example.

As illustrated in FIG. 4, in another example, a repeater can be a multiband bi-directional wireless signal booster 400 configured to amplify an uplink signal and a downlink signal in multiple bands using a separate signal path for one or more uplink frequency bands and one or more downlink frequency bands. In one embodiment, adjacent bands can be included on a same signal path.

An outside antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to an inside antenna 430, or an integrated device antenna. The inside antenna 430 can communicate the amplified downlink signal to a wireless device, such as a UE.

In another example, the inside antenna 430 can receive an uplink (UL) signal from a wireless device. The uplink signal can include Band 1 signal and a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the outside antenna 410, or an integrated device antenna. The outside antenna 410 can communicate the amplified uplink signals to a base station.

Figure 5:
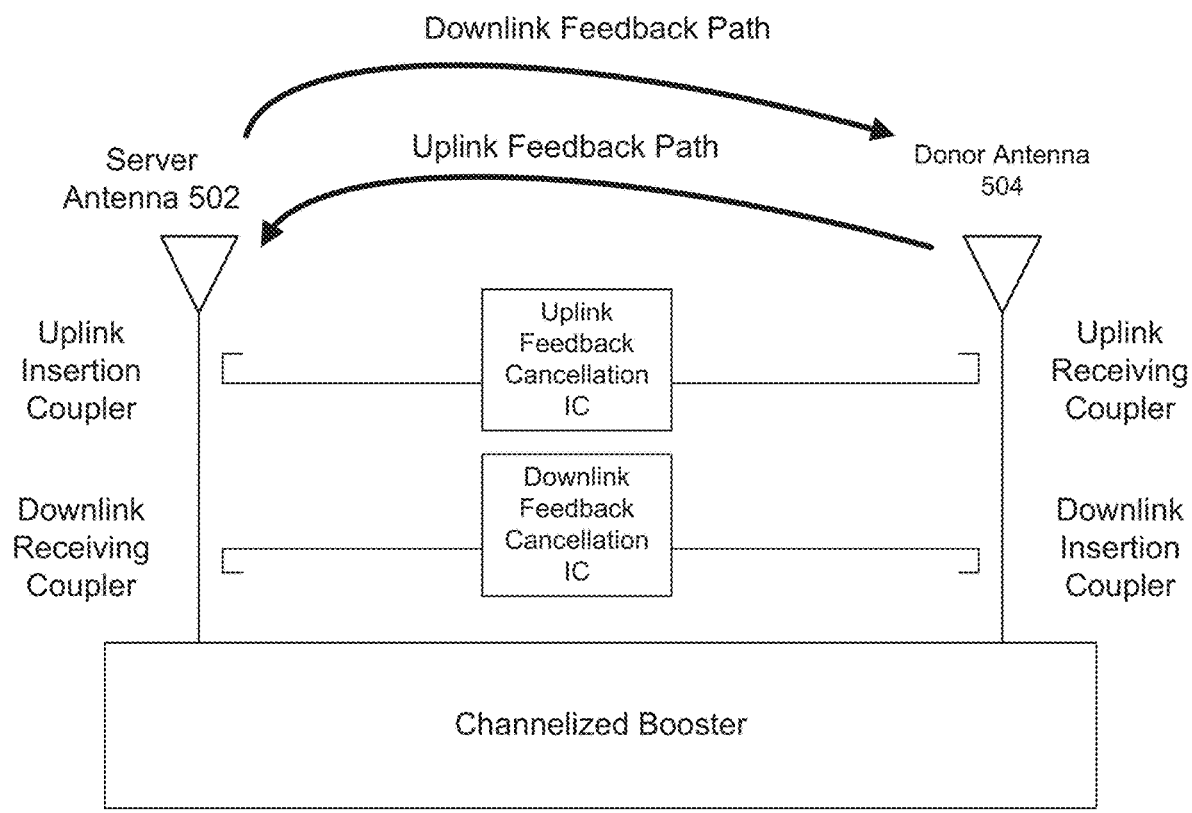
FIG. 5 illustrates a bi-directional repeater system with feedback cancellation in accordance with an example.

In another example, FIG. 5 illustrates a bi-directional repeater system with feedback cancellation. A bi-directional repeater system can comprise a signal booster or channelized booster connected to an outside antenna 504 or donor antenna 504 and an inside antenna 502 or server antenna 502. The bi-directional repeater system can further comprise: a first direction amplification and filtering path coupled between the server antenna port and the donor antenna port; and a second-direction amplification and filtering path coupled between the server antenna port and the donor antenna port. A first duplexer can be coupled between the server antenna port and the first-direction amplification path and the second-direction amplification path; and a second duplexer can be coupled between the donor antenna port and the first-direction amplification path and the second-direction amplification path.

In this example, an uplink insertion coupler can feed a first-direction signal to an uplink feedback cancellation integrated circuit (IC). A first-direction cancellation signal can be generated at the uplink feedback cancellation IC and coupled onto the uplink receiving coupler. The first-direction cancellation signal can reduce antenna-to-antenna feedback for a single band in a first direction between the donor antenna 504 and the server antenna 502 by reducing antenna-to-antenna feedback along the uplink feedback path. Similarly, in this example, a downlink insertion coupler can feed a second-direction signal to a downlink feedback cancellation integrated circuit (IC). A second-direction cancellation signal can be generated at the downlink feedback cancellation IC and coupled onto the downlink receiving coupler. The second-direction cancellation signal can reduce antenna-to-antenna feedback for a single band in a second direction between the donor antenna 504 and the server antenna 502 by reducing antenna-to-antenna feedback along the downlink feedback path.

Figure 6:
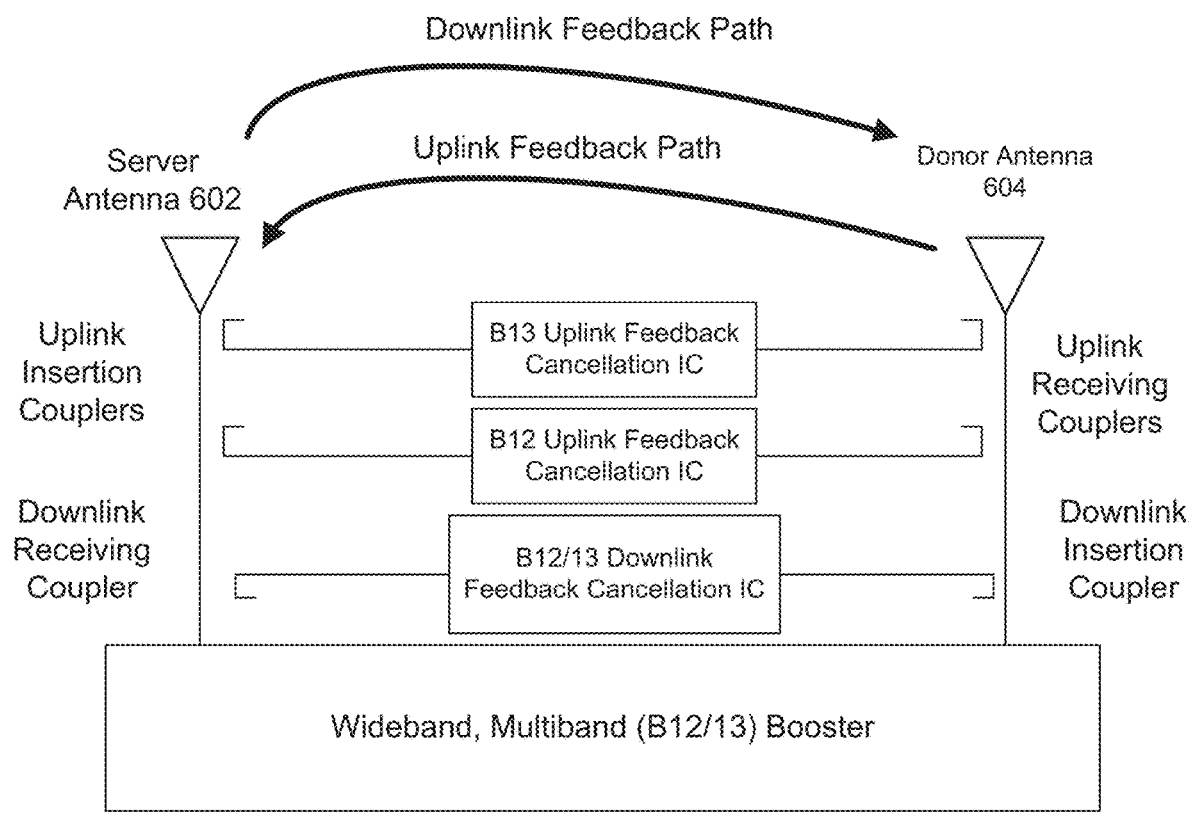
FIG. 6 illustrates a multiband bi-directional repeater system with feedback cancellation in accordance with an example.

In another example, FIG. 6 illustrates a multiband bi-directional repeater system with feedback cancellation. A multiband bi-directional repeater system can comprise a wideband, multiband signal booster connected to an outside antenna 604 or donor antenna 604 and an inside antenna 602 or server antenna 602. The multiband bi-directional repeater system can further comprise: a first direction amplification and filtering path coupled between the server antenna port and the donor antenna port; and additional first-direction amplification and filtering path coupled between the server antenna port and the donor antenna port; and a second-direction amplification and filtering path coupled between the server antenna port and the donor antenna port. A first duplexer can be coupled between the server antenna port and the first-direction amplification path and the second-direction amplification path; and a second duplexer can be coupled between the donor antenna port and the first-direction amplification path and the second-direction amplification path.

In this example, a band 13 uplink insertion coupler can feed an uplink band 13 signal to a band 13 uplink feedback cancellation integrated circuit (IC). An uplink band 13 cancellation signal can be generated at the band 13 uplink feedback cancellation IC and coupled onto the band 13 uplink receiving coupler. The uplink band 13 cancellation signal can reduce antenna-to-antenna feedback for uplink band 13 between the donor antenna 604 and the server antenna 602 by reducing antenna-to-antenna feedback along the uplink feedback path.

Similarly, a band 12 uplink insertion coupler can feed an uplink band 12 signal to a band 12 uplink feedback cancellation integrated circuit (IC). An uplink band 12 cancellation signal can be generated at the band 12 uplink feedback cancellation IC and coupled onto the band 12 uplink receiving coupler. The uplink band 12 cancellation signal can reduce antenna-to-antenna feedback for uplink band 12 between the donor antenna 604 and the server antenna 602 by reducing antenna-to-antenna feedback along the uplink feedback path.

A band 12/13 downlink insertion coupler can feed a combined band 12 and band 13 downlink signal to a combined band 12 and band 13 downlink feedback cancellation integrated circuit (IC). A combined band 12 and band 13 downlink cancellation signal can be generated at the combined band 12 and band 13 downlink feedback cancellation IC and coupled onto the combined band 12 and band 13 downlink receiving coupler. The combined band 12 and band 13 downlink cancellation signal can reduce antenna-to-antenna feedback for downlink band 12 and downlink band 13 between the donor antenna 604 and the server antenna 602 by reducing antenna-to-antenna feedback along the downlink feedback path.

Figure 7:
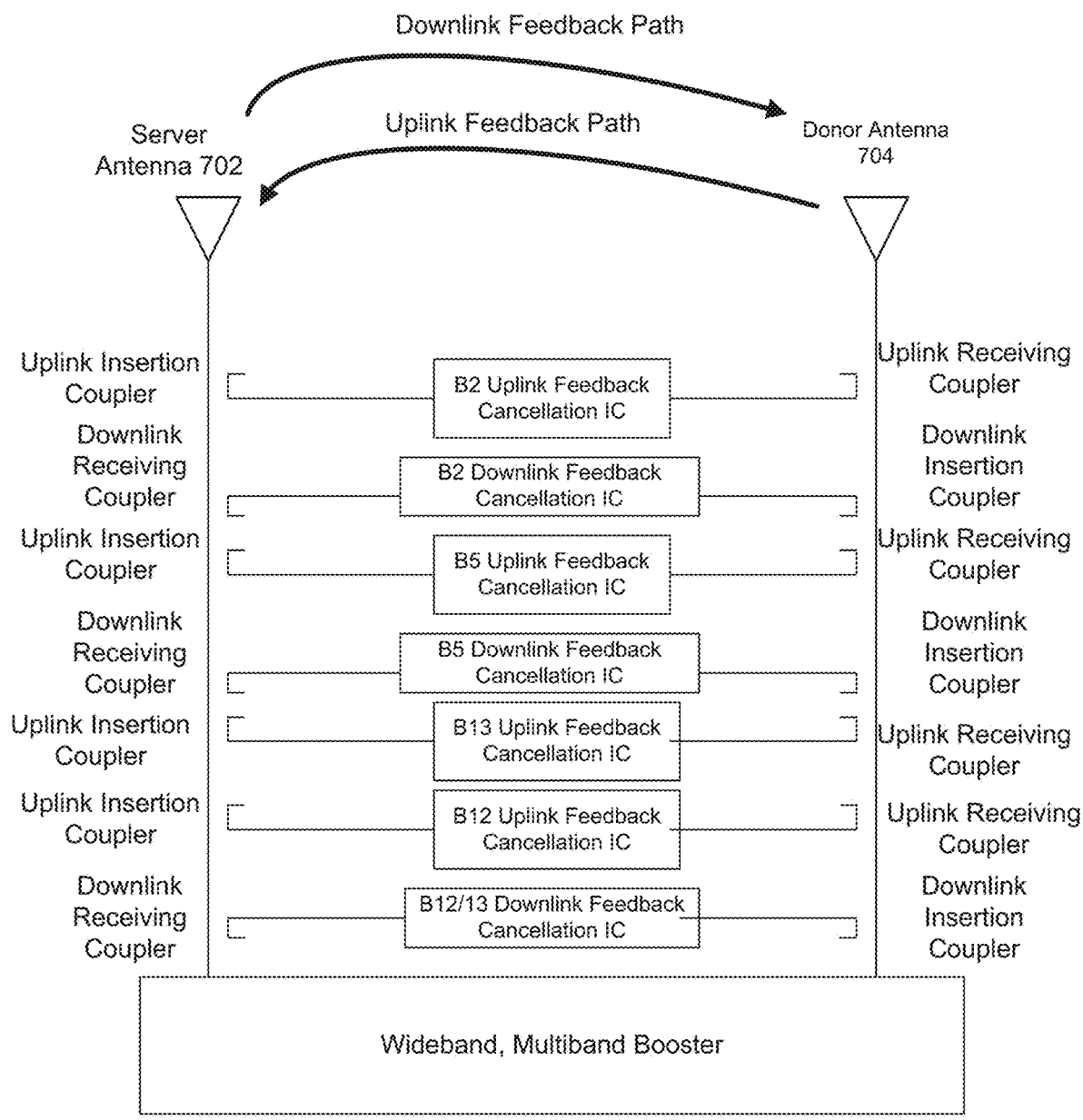
FIG. 7 illustrates a multiband bi-directional repeater system with feedback cancellation in accordance with an example.

In another example, FIG. 7 illustrates a multiband bi-directional repeater system with feedback cancellation. A multiband bi-directional repeater system can comprise a wideband, multiband booster connected to an outside antenna 704 or donor antenna 704 and an inside antenna 702 or server antenna 702. The multiband bi-directional repeater system can further comprise: a first direction amplification and filtering path coupled between the server antenna port and the donor antenna port; and an nth first-direction amplification and filtering path coupled between the server antenna port and the donor antenna port, wherein n can be an integer greater than or equal to 1; a second-direction amplification and filtering path coupled between the server antenna port and the donor antenna port; and an mth second-direction amplification and filtering path coupled between the server antenna port and the donor antenna port, wherein m is an integer greater than or equal to 1. A first duplexer can be coupled between the server antenna port and the first-direction amplification path and the second-direction amplification path; and a second duplexer can be coupled between the donor antenna port and the first-direction amplification path and the second-direction amplification path.

In another example, an uplink insertion coupler can feed a first-direction signal to an uplink feedback cancellation integrated circuit (IC). A first-direction cancellation signal can be generated at the uplink feedback cancellation IC and coupled onto the uplink receiving coupler. The first-direction cancellation signal can reduce antenna-to-antenna feedback for a single band in a first direction between the donor antenna 704 and the server antenna 702 by reducing antenna-to-antenna feedback along the uplink feedback path. Similarly, in this example, a downlink insertion coupler can feed a second-direction signal to a downlink feedback cancellation integrated circuit (IC). A second-direction cancellation signal can be generated at the downlink feedback cancellation IC and coupled onto the downlink receiving coupler. The second-direction cancellation signal can reduce antenna-to-antenna feedback for a single band in a second direction between the donor antenna 704 and the server antenna 702 by reducing antenna-to-antenna feedback along the downlink feedback path.

In another example, an nth uplink insertion coupler can feed an nth first-direction signal to an nth uplink feedback cancellation integrated circuit (IC). An nth first-direction cancellation signal can be generated at the nth uplink feedback cancellation IC and coupled onto the nth uplink receiving coupler. The nth first-direction cancellation signal can reduce antenna-to-antenna feedback for an nth band in a first direction between the donor antenna 704 and the server antenna 702 by reducing antenna-to-antenna feedback along the uplink feedback path. In this example, n can be an integer greater than or equal to 1.

Similarly, in another example, an mth downlink insertion coupler can feed an mth second-direction signal to an mth downlink feedback cancellation integrated circuit (IC). An mth second-direction cancellation signal can be generated at the mth downlink feedback cancellation IC and coupled onto the mth downlink receiving coupler. The mth second-direction cancellation signal can reduce antenna-to-antenna feedback for an mth band in a second direction between the donor antenna 704 and the server antenna 702 by reducing antenna-to-antenna feedback along the downlink feedback path. In this example, m can be an integer greater than or equal to 1.

In another example, one or more of the n first-direction amplification and filtering paths can be configured to communicate two or more adjacent bands on a single path. In another example, one or more of the m second-direction amplification and filtering paths can be configured to communicate two or more adjacent bands on a single path. The two or more adjacent bands can include 3GPP LTE downlink band 12 and downlink band 13.

In another example, a band 2 uplink insertion coupler can feed a band 2 uplink signal to a band 2 uplink feedback cancellation integrated circuit (IC). An uplink band 2 cancellation signal can be generated at the band 2 uplink feedback cancellation IC and coupled onto the band 2 uplink receiving coupler. The uplink band 2 cancellation signal can reduce antenna-to-antenna feedback for uplink band 2 in a first direction between the donor antenna 704 and the server antenna 702 by reducing antenna-to-antenna feedback along the uplink feedback path.

In another example, a band 5 uplink insertion coupler can feed a band 5 uplink signal to a band 5 uplink feedback cancellation integrated circuit (IC). An uplink band 5 cancellation signal can be generated at the band 5 uplink feedback cancellation IC and coupled onto the band 5 uplink receiving coupler. The uplink band 5 cancellation signal can reduce antenna-to-antenna feedback for uplink band 5 in a first direction between the donor antenna 704 and the server antenna 702 by reducing antenna-to-antenna feedback along the uplink feedback path.

In another example, a band 2 downlink insertion coupler can feed a band 2 downlink signal to a band 2 downlink feedback cancellation integrated circuit (IC). A downlink band 2 cancellation signal can be generated at the band 2 downlink feedback cancellation IC and coupled onto the band 2 downlink receiving coupler. The downlink band 2 cancellation signal can reduce antenna-to-antenna feedback for downlink band 2 in a second direction between the donor antenna 704 and the server antenna 702 by reducing antenna-to-antenna feedback along the downlink feedback path.

In another example, a band 5 downlink insertion coupler can feed a band 5 downlink signal to a band 5 downlink feedback cancellation integrated circuit (IC). A downlink band 5 cancellation signal can be generated at the band 5 downlink feedback cancellation IC and coupled onto the band 5 downlink receiving coupler. The downlink band 5 cancellation signal can reduce antenna-to-antenna feedback for downlink band 5 in a second direction between the donor antenna 704 and the server antenna 702 by reducing antenna-to-antenna feedback along the downlink feedback path.

In another example, a band 13 uplink insertion coupler can feed a band 13 uplink signal to a band 13 uplink feedback cancellation integrated circuit (IC). An uplink band 13 cancellation signal can be generated at the band 13 uplink feedback cancellation IC and coupled onto the band 13 uplink receiving coupler. The uplink band 13 cancellation signal can reduce antenna-to-antenna feedback for uplink band 13 in a first direction between the donor antenna 704 and the server antenna 702 by reducing antenna-to-antenna feedback along the uplink feedback path.

In another example, a band 12 uplink insertion coupler can feed a band 12 uplink signal to a band 12 uplink feedback cancellation integrated circuit (IC). An uplink band 12 cancellation signal can be generated at the band 12 uplink feedback cancellation IC and coupled onto the band 12 uplink receiving coupler. The uplink band 12 cancellation signal can reduce antenna-to-antenna feedback for uplink band 12 in a first direction between the donor antenna 704 and the server antenna 702 by reducing antenna-to-antenna feedback along the uplink feedback path.

In another example, a combined band 12 and band 13 downlink insertion coupler can feed a combined band 12 and band 13 downlink signal to a combined band 12 and band 13 downlink feedback cancellation integrated circuit (IC). A combined band 12 and band 13 downlink cancellation signal can be generated at the combined band 12 and band 13 downlink feedback cancellation IC and coupled onto the combined band 12 and band 13 downlink receiving coupler. The combined band 12 and band 13 downlink cancellation signal can reduce antenna-to-antenna feedback for combined band 12 and band 13 downlink in a second direction between the donor antenna 704 and the server antenna 702 by reducing antenna-to-antenna feedback along the downlink feedback path.

Figure 8A:
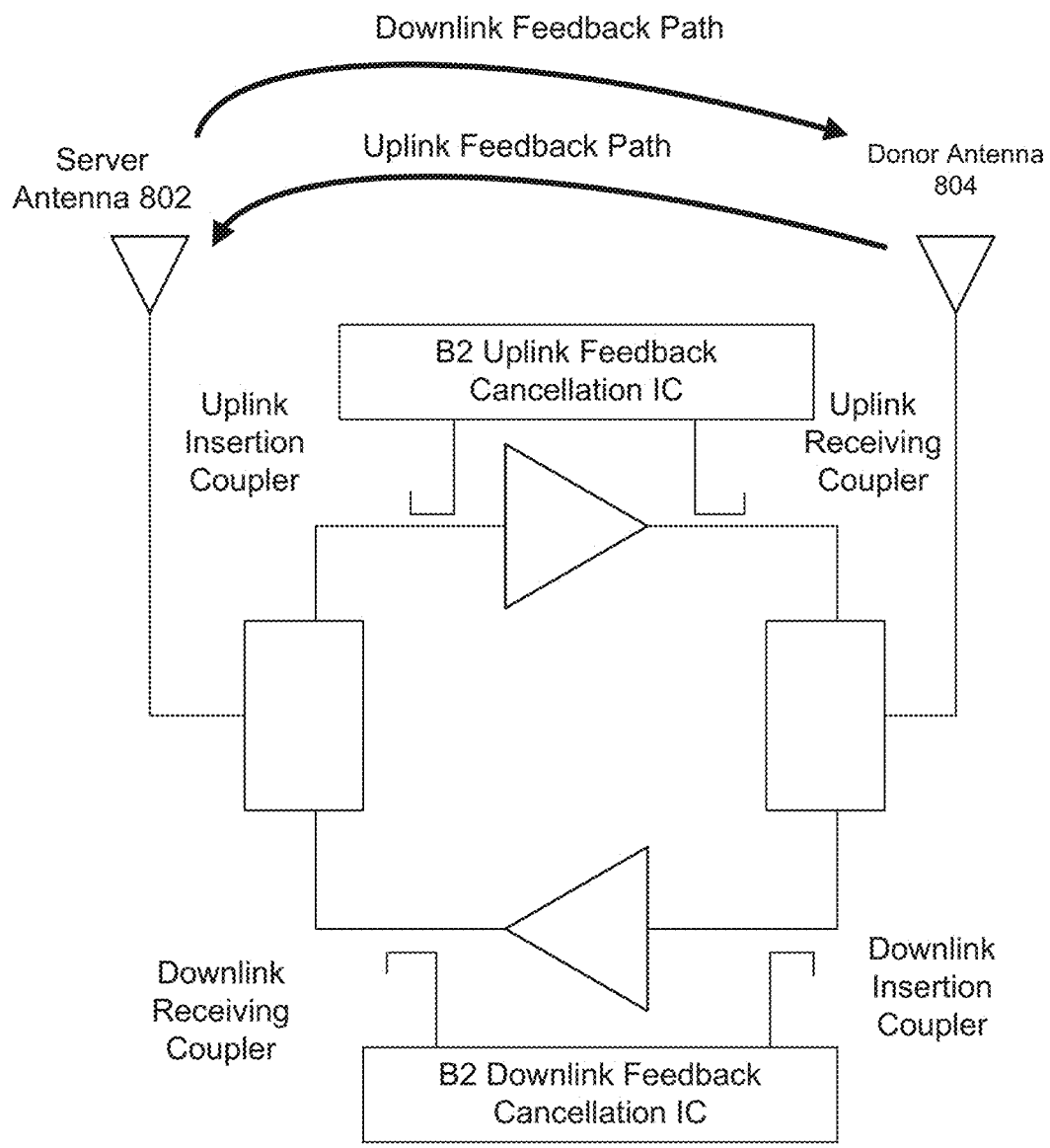
FIG. 8a illustrates a bi-directional repeater system with feedback cancellation in accordance with an example.

In another example, FIG. 8*a* illustrates a bi-directional repeater system with feedback cancellation. In this example, the uplink feedback cancellation circuit can be positioned after the diplexer/duplexer/multiplexer/circulator/splitter of the repeater, within the signal path, instead of at the server antenna port. Similarly, the downlink feedback cancellation circuit can be positioned after the diplexer/duplexer/multiplexer/circulator/splitter of the repeater, within the signal path, instead of at the donor antenna port.

In another example, a band 2 uplink insertion coupler can feed a band 2 uplink signal to a band 2 uplink feedback cancellation integrated circuit (IC). An uplink band 2 cancellation signal can be generated at the band 2 uplink feedback cancellation IC and coupled onto the band 2 uplink receiving coupler. The uplink band 2 cancellation signal can reduce antenna-to-antenna feedback for uplink band 2 in a first direction between the donor antenna 804 and the server antenna 802 by reducing antenna-to-antenna feedback along the uplink feedback path.

In another example, a band 2 downlink insertion coupler can feed a band 2 downlink signal to a band 2 downlink feedback cancellation integrated circuit (IC). A downlink band 2 cancellation signal can be generated at the band 2 downlink feedback cancellation IC and coupled onto the band 2 downlink receiving coupler. The downlink band 2 cancellation signal can reduce antenna-to-antenna feedback for downlink band 2 in a second direction between the donor antenna 804 and the server antenna 802 by reducing antenna-to-antenna feedback along the downlink feedback path.

Positioning the uplink feedback cancellation circuit after the diplexer/duplexer/multiplexer/circulator/splitter of the repeater or positioning the downlink feedback cancellation circuit after the diplexer/duplexer/multiplexer/circulator/splitter of the repeater, within the signal path, instead of at the server or the donor antenna ports, can be easier to use in the case of multiband boosters because there may not be a series of couplers in a row.

In another example, the band 12 and band 13 uplink and downlink feedback cancellation circuits can be positioned after the diplexer/duplexer/multiplexer/circulator/splitter of the repeater, within the signal path, instead of at the server or the donor antenna ports.

In another example, a band 13 uplink insertion coupler can feed a band 13 uplink signal to a band 13 uplink feedback cancellation integrated circuit (IC). An uplink band 13 cancellation signal can be generated at the band 13 uplink feedback cancellation IC and coupled onto the band 13 uplink receiving coupler. The uplink band 13 cancellation signal can reduce antenna-to-antenna feedback for uplink band 13 in a first direction between the donor antenna 804 and the server antenna 802 by reducing antenna-to-antenna feedback along the uplink feedback path.

In another example, a band 12 uplink insertion coupler can feed a band 12 uplink signal to a band 12 uplink feedback cancellation integrated circuit (IC). An uplink band 12 cancellation signal can be generated at the band 12 uplink feedback cancellation IC and coupled onto the band 12 uplink receiving coupler. The uplink band 12 cancellation signal can reduce antenna-to-antenna feedback for uplink band 12 in a first direction between the donor antenna 804 and the server antenna 802 by reducing antenna-to-antenna feedback along the uplink feedback path.

In another example, a combined band 12 and band 13 downlink insertion coupler can feed a combined band 12 and band 13 downlink signal to a combined band 12 and band 13 downlink feedback cancellation integrated circuit (IC). A combined band 12 and band 13 downlink cancellation signal can be generated at the combined band 12 and band 13 downlink feedback cancellation IC and coupled onto the combined band 12 and band 13 downlink receiving coupler. The combined band 12 and band 13 downlink cancellation signal can reduce antenna-to-antenna feedback for combined band 12 and band 13 downlink in a second direction between the donor antenna 804 and the server antenna 802 by reducing antenna-to-antenna feedback along the downlink feedback path.

In another example, n additional first-direction two-antenna RF feedback cancellation circuits can be positioned after the diplexer/duplexer/multiplexer/circulator/splitter of the repeater, within the signal path, instead of at the server or the donor antenna ports. The n additional first-direction two-antenna RF feedback cancellation circuits can reduce antenna-to-antenna feedback for each of n bands in a first direction. In this example, n can be an integer greater than 0.

In another example, m additional second-direction two-antenna RF feedback cancellation circuits can be positioned after the diplexer/duplexer/multiplexer/circulator/splitter of the repeater, within the signal path, instead of at the server or the donor antenna ports. The m additional second-direction two-antenna RF feedback cancellation circuits can reduce antenna-to-antenna feedback for each of m bands in a second direction. In this example, m can be an integer greater than 0.

Figure 8B:
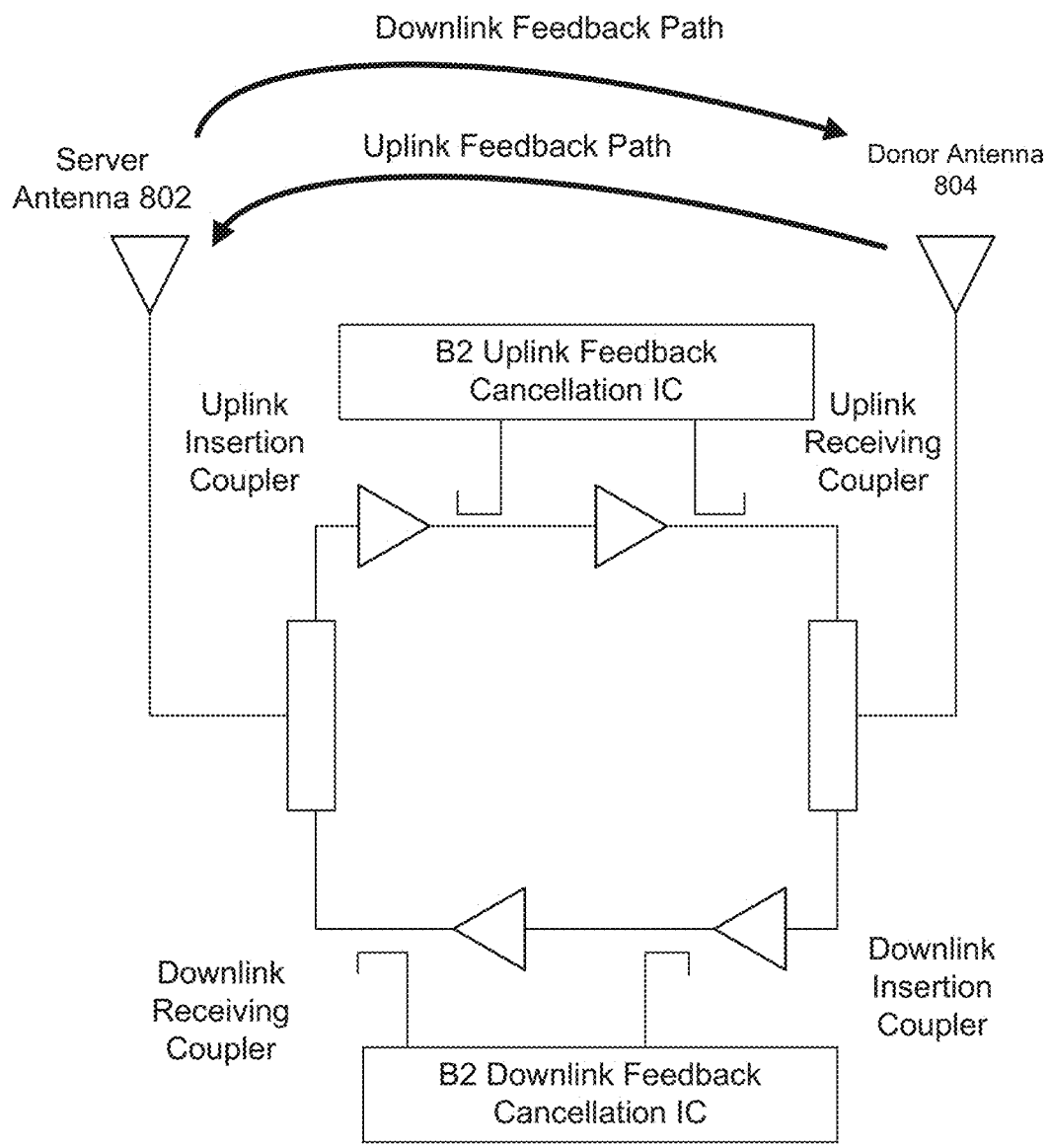
FIG. 8b illustrates a bi-directional repeater system with feedback cancellation in accordance with an example.

In another example, FIG. 8b illustrates a bi-directional repeater system with feedback cancellation. A bi-directional repeater system can comprise an outside antenna 804 or donor antenna 804 and an inside antenna 802 or server antenna 802. The outside antenna 804 or donor antenna 804 can be connected to a donor antenna port. The inside antenna 802 or server antenna 802 can be connected to a server antenna port. The bi-directional repeater system can further comprise: a first direction amplification and filtering path coupled between the server antenna port and the donor antenna port; and a second-direction amplification and filtering path coupled between the server antenna port and the donor antenna port. A first duplexer can be coupled between the server antenna port and the first-direction amplification path and the second-direction amplification path; and a second duplexer can be coupled between the donor antenna port and the first-direction amplification path and the second-direction amplification path.

In another example, a first-direction two-antenna radio frequency (RF) feedback cancellation circuit can be positioned after the first duplexer of the repeater, within the signal path, instead of at the server antenna port. The first duplexer can be replaced by a diplexer, multiplexer, circulator, or splitter. The first-direction two-antenna RF feedback cancellation circuit can reduce antenna-to-antenna feedback in a first direction.

Similarly, a second-direction two-antenna RF feedback cancellation circuit can be positioned after the second duplexer of the repeater, within the signal path, instead of at the donor antenna port. The second duplexer can be replaced by a diplexer, multiplexer, circulator, or splitter. The second-direction two-antenna RF feedback cancellation circuit can reduce antenna-to-antenna feedback in a second direction.

In another example, a first-direction low noise amplifier (LNA) can be coupled between the first duplexer and the first-direction two-antenna RF feedback cancellation circuit. A first-direction power amplifier (PA) can be coupled between the second duplexer and the first-direction LNA. In this example, the first-direction two-antenna RF feedback cancellation circuit can be configured to sample a first-direction signal at an output of the first-direction PA. The first-direction two-antenna RF feedback cancellation circuit can be configured to generate a first-direction cancellation signal. The first-direction two-antenna RF feedback cancellation circuit can be configured to inject a first-direction cancellation signal at an output of the first-direction LNA. Injection of the first-direction cancellation signal at the output of the first-direction LNA can reduce the impact to the noise figure. The impact to the noise figure can be reduced by reducing the amount of loss before the LNA. In one example, injection of the first-direction cancellation signal at the input of the first-direction LNA can add loss that directly adds to the noise figure. By injecting the first-direction cancellation signal at the output of the first-direction LNA, there is a reduced impact to the noise figure.

In another example, the first-direction two-antenna RF feedback cancellation circuit can be configured to sample a first-direction signal at an input of the first-direction PA. The first-direction two-antenna RF feedback cancellation circuit can be configured to generate a first-direction cancellation signal. The first-direction two-antenna RF feedback cancellation circuit can be configured to inject a first-direction cancellation signal at an output of the first-direction LNA or at an input of the first-direction LNA.

In another example, a second-direction low noise amplifier (LNA) can be coupled between the second duplexer and the second-direction two-antenna RF feedback cancellation circuit. A second-direction power amplifier (PA) can be coupled between the first duplexer and the second-direction LNA. In this example, the second-direction two-antenna RF feedback cancellation circuit can be configured to sample a second-direction signal at an output of the second-direction PA. The second-direction two-antenna RF feedback cancellation circuit can be configured to generate a second-direction cancellation signal. The second-direction two-antenna RF feedback cancellation circuit can be configured to inject a second-direction cancellation signal at an output of the second-direction LNA. Injection of the second-direction cancellation signal at the output of the second-direction LNA can reduce the impact to the noise figure. The impact to the noise figure can be reduced by reducing the amount of loss before the LNA. In one example, injection of the second-direction cancellation signal at the input of the second-direction LNA can add loss that directly adds to the noise figure. By injecting the second-direction cancellation signal at the output of the second-direction LNA, there is a reduced impact to the noise figure.

In another example, the second-direction two-antenna RF feedback cancellation circuit can be configured to sample a second-direction signal at an input of the second-direction PA. The second-direction two-antenna RF feedback cancellation circuit can be configured to generate a second-direction cancellation signal. The second-direction two-antenna RF feedback cancellation circuit can be configured to inject a second-direction cancellation signal at an output of the second-direction LNA or at an input of the second-direction LNA.

In another example, a multiband bi-directional repeater system with feedback cancellation can comprise an outside antenna or donor antenna and an inside antenna or server antenna. The outside antenna or donor antenna can be connected to a donor antenna port. The inside antenna or server antenna can be connected to a server antenna port. The multiband bi-directional repeater system can further comprise: a first first-direction amplification and filtering path coupled between the server antenna port and the donor antenna port; an nth first-direction amplification and filtering path coupled between the server antenna port and the donor antenna port; a second-direction amplification and filtering path coupled between the server antenna port and the donor antenna port; and an mth second-direction amplification and filtering path coupled between the server antenna port and the donor antenna port. In this example, n can be an integer greater than or equal to 1. In this example, m can be an integer greater than or equal to 1. A first duplexer can be coupled between the server antenna port and the first-direction amplification path and the second-direction amplification path; and a second duplexer can be coupled between the donor antenna port and the first-direction amplification path and the second-direction amplification path.

In another example, an uplink insertion coupler can feed a first-direction signal to an uplink feedback cancellation integrated circuit (IC). A first-direction cancellation signal can be generated at the uplink feedback cancellation IC and coupled onto the uplink receiving coupler. The first-direction cancellation signal can reduce antenna-to-antenna feedback for a single band in a first direction between the donor antenna and the server antenna by reducing antenna-to-antenna feedback along the uplink feedback path. Similarly, in this example, a downlink insertion coupler can feed a second-direction signal to a downlink feedback cancellation integrated circuit (IC). A second-direction cancellation signal can be generated at the downlink feedback cancellation IC and coupled onto the downlink receiving coupler. The second-direction cancellation signal can reduce antenna-to-antenna feedback for a single band in a second direction between the donor antenna and the server antenna by reducing antenna-to-antenna feedback along the downlink feedback path.

In another example, an nth uplink insertion coupler can feed an nth first-direction signal to an nth uplink feedback cancellation integrated circuit (IC). An nth first-direction cancellation signal can be generated at the nth uplink feedback cancellation IC and coupled onto the nth uplink receiving coupler. The nth first-direction cancellation signal can reduce antenna-to-antenna feedback for an nth band in a first direction between the donor antenna and the server antenna by reducing antenna-to-antenna feedback along the uplink feedback path. In this example, n can be an integer greater than or equal to 1.

Similarly, in another example, an mth downlink insertion coupler can feed an mth second-direction signal to an mth downlink feedback cancellation integrated circuit (IC). An mth second-direction cancellation signal can be generated at the mth downlink feedback cancellation IC and coupled onto the mth downlink receiving coupler. The mth second-direction cancellation signal can reduce antenna-to-antenna feedback for an mth band in a second direction between the donor antenna and the server antenna by reducing antenna-to-antenna feedback along the downlink feedback path. In this example, m can be an integer greater than or equal to 1.

In another example, a first first-direction low-noise amplifier (LNA) can be coupled between the first duplexer and the first first-direction two-antenna RF feedback cancellation circuit. A first first-direction power amplifier (PA) can be coupled between the second duplexer and the first first-direction LNA. In this example, the first first-direction two-antenna RF feedback cancellation circuit can be configured to sample a first first-direction signal at an output of the first first-direction PA. The first first-direction two-antenna RF feedback cancellation circuit can be configured to generate a first first-direction cancellation signal. The first first-direction two-antenna RF feedback cancellation circuit can be configured to inject a first first-direction cancellation signal at an output of the first first-direction LNA. Injection of the first first-direction cancellation signal at the output of the first first-direction LNA can reduce the impact to the noise figure. The impact to the noise figure can be reduced by reducing the amount of loss before the LNA. In one example, injection of the first first-direction cancellation signal at the input of the first first-direction LNA can add loss that directly adds to the noise figure. By injecting the first first-direction cancellation signal at the output of the first first-direction LNA, there is a reduced impact to the noise figure.

In another example, the first first-direction two-antenna RF feedback cancellation circuit can be configured to sample a first first-direction signal at an input of the first first-direction PA. The first first-direction two-antenna RF feedback cancellation circuit can be configured to generate a first first-direction cancellation signal. The first first-direction two-antenna RF feedback cancellation circuit can be configured to inject a first first-direction cancellation signal at an output of the first first-direction LNA or at an input of the first first-direction LNA.

In another example, a first second-direction low-noise amplifier (LNA) can be coupled between the second duplexer and the first second-direction two-antenna RF feedback cancellation circuit. A first second-direction power amplifier (PA) can be coupled between the first duplexer and the first second-direction LNA. In this example, the first second-direction two-antenna RF feedback cancellation circuit can be configured to sample a first second-direction signal at an output of the first second-direction PA. The first second-direction two-antenna RF feedback cancellation circuit can be configured to generate a first second-direction cancellation signal. The first second-direction two-antenna RF feedback cancellation circuit can be configured to inject a first second-direction cancellation signal at an output of the first second-direction LNA. Injection of the first second-direction cancellation signal at the output of the first second-direction LNA can reduce the impact to the noise figure. The impact to the noise figure can be reduced by reducing the amount of loss before the LNA. In one example, injection of the first second-direction cancellation signal at the input of the first second-direction LNA can add loss that directly adds to the noise figure. By injecting the first second-direction cancellation signal at the output of the first second-direction LNA, there is a reduced impact to the noise figure.

In another example, the first second-direction two-antenna RF feedback cancellation circuit can be configured to sample a first second-direction signal at an input of the first second-direction PA. The first second-direction two-antenna RF feedback cancellation circuit can be configured to generate a first second-direction cancellation signal. The first second-direction two-antenna RF feedback cancellation circuit can be configured to inject a first second-direction cancellation signal at an output of the first second-direction LNA or at an input of the first second-direction LNA.

In another example, an nth first-direction low-noise amplifier (LNA) can be coupled between the first duplexer and the nth first-direction two-antenna RF feedback cancellation circuit. An nth first-direction power amplifier (PA) can be coupled between the second duplexer and the nth first-direction LNA. In this example, the nth first-direction two-antenna RF feedback cancellation circuit can be configured to sample an nth first-direction signal at an output of the nth first-direction PA. The nth first-direction two-antenna RF feedback cancellation circuit can be configured to generate an nth first-direction cancellation signal. The nth first-direction two-antenna RF feedback cancellation circuit can be configured to inject an nth first-direction cancellation signal at an output of the nth first-direction LNA. In this example, n can be an integer greater than or equal to 1. Injection of the nth first-direction cancellation signal at the output of the nth first-direction LNA can reduce the impact to the noise figure. The impact to the noise figure can be reduced by reducing the amount of loss before the LNA. In one example, injection of the nth first-direction cancellation signal at the input of the nth first-direction LNA can add loss that directly adds to the noise figure. By injecting the nth first-direction cancellation signal at the output of the nth first-direction LNA, there is a reduced impact to the noise figure.

In another example, the nth first-direction two-antenna RF feedback cancellation circuit can be configured to sample an nth first-direction signal at an input of the nth first-direction PA. The nth first-direction two-antenna RF feedback cancellation circuit can be configured to generate an nth first-direction cancellation signal. The nth first-direction two-antenna RF feedback cancellation circuit can be configured to inject an nth first-direction cancellation signal at an output of the nth first-direction LNA or at an input of the nth first-direction LNA.

In another example, an mth second-direction low-noise amplifier (LNA) can be coupled between the second duplexer and the mth second-direction two-antenna RF feedback cancellation circuit. An mth second-direction power amplifier (PA) can be coupled between the first duplexer and the mth second-direction LNA. In this example, the mth second-direction two-antenna RF feedback cancellation circuit can be configured to sample an mth second-direction signal at an output of the mth second-direction PA. The mth second-direction two-antenna RF feedback cancellation circuit can be configured to generate an mth second-direction cancellation signal. The mth second-direction two-antenna RF feedback cancellation circuit can be configured to inject an mth second-direction cancellation signal at an output of the mth second-direction LNA. In this example, m can be an integer greater than or equal to 1. Injection of the mth second-direction cancellation signal at the output of the mth second-direction LNA can reduce the impact to the noise figure. The impact to the noise figure can be reduced by reducing the amount of loss before the LNA. In one example, injection of the mth second-direction cancellation signal at the input of the mth second-direction LNA can add loss that directly adds to the noise figure. By injecting the mth second-direction cancellation signal at the output of the mth second-direction LNA, there is a reduced impact to the noise figure.

In another example, the mth second-direction two-antenna RF feedback cancellation circuit can be configured to sample an mth second-direction signal at an input of the mth second-direction PA. The mth second-direction two-antenna RF feedback cancellation circuit can be configured to generate an mth second-direction cancellation signal. The mth second-direction two-antenna RF feedback cancellation circuit can be configured to inject an mth second-direction cancellation signal at an output of the mth second-direction LNA or at an input of the mth second-direction LNA.

In another example, one or more of the n first-direction amplification and filtering paths can be configured to communicate two or more adjacent bands on a single path. In another example, one or more of the m second-direction amplification and filtering paths can be configured to communicate two or more adjacent bands on a single path. The two or more adjacent bands can include 3GPP LTE downlink band 12 and downlink band 13.

Figure 9:
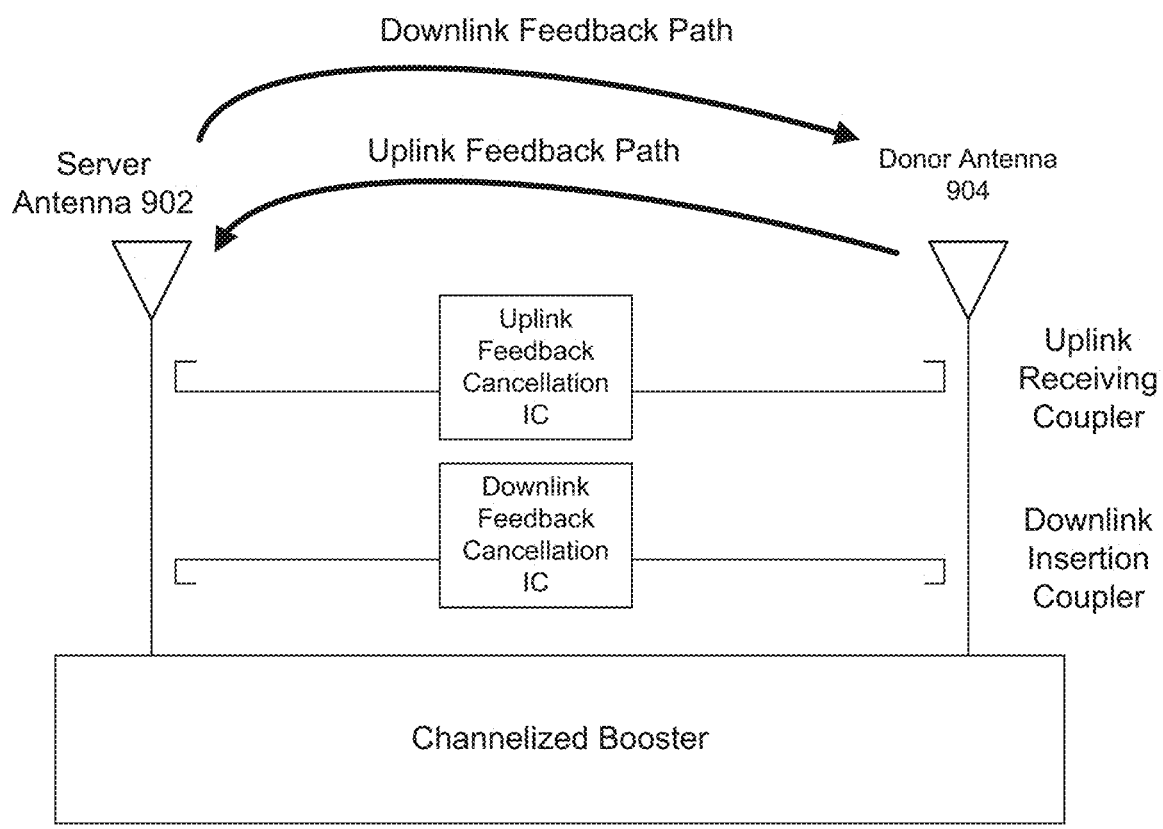
FIG. 9 illustrates a bi-directional repeater system with feedback cancellation in accordance with an example.

In another example, as illustrated in FIG. 9, the repeater can be a time division duplex (TDD) system. A bi-directional repeater system can comprise a signal booster or channelized booster connected to an outside antenna 904 or donor antenna 904 and an inside antenna 902 or server antenna 902. The bi-directional repeater system can further comprise: a first direction amplification and filtering path coupled between the server antenna port and the donor antenna port; and a second-direction amplification and filtering path coupled between the server antenna port and the donor antenna port. A first duplexer can be coupled between the server antenna port and the first-direction amplification path and the second-direction amplification path; and a second duplexer can be coupled between the donor antenna port and the first-direction amplification path and the second-direction amplification path.

In another example, a time division duplex (TDD) two-antenna radio frequency (RF) feedback cancellation circuit can be coupled between the server antenna port and the donor antenna port. An uplink insertion coupler can feed a first-direction signal to an uplink feedback cancellation integrated circuit (IC). A first-direction cancellation signal can be generated at the uplink feedback cancellation IC and coupled onto the uplink receiving coupler. The first-direction cancellation signal can reduce antenna-to-antenna feedback for a single band in a first direction between the donor antenna 904 and the server antenna 902 by reducing antenna-to-antenna feedback along the uplink feedback path. Similarly, in this example, a downlink insertion coupler can feed a second-direction signal to a downlink feedback cancellation integrated circuit (IC). A second-direction cancellation signal can be generated at the downlink feedback cancellation IC and coupled onto the downlink receiving coupler. The second-direction cancellation signal can reduce antenna-to-antenna feedback for a single band in a second direction between the donor antenna 904 and the server antenna 902 by reducing antenna-to-antenna feedback along the downlink feedback path.

In this example, the first-direction cancellation and the second-direction cancellation can alternate in the same way that the signal transmission alternates. This switching can have a small delay relative to the signal switching due to the delay in transmitting from one antenna to another. In this example, two separate integrated circuits (ICs) can be used for each of the first-direction path and the second-direction path for each band. Band 12 and Band 13 downlink can share a single IC because band 12 and band 13 are spectrally adjacent.

Figure 10:
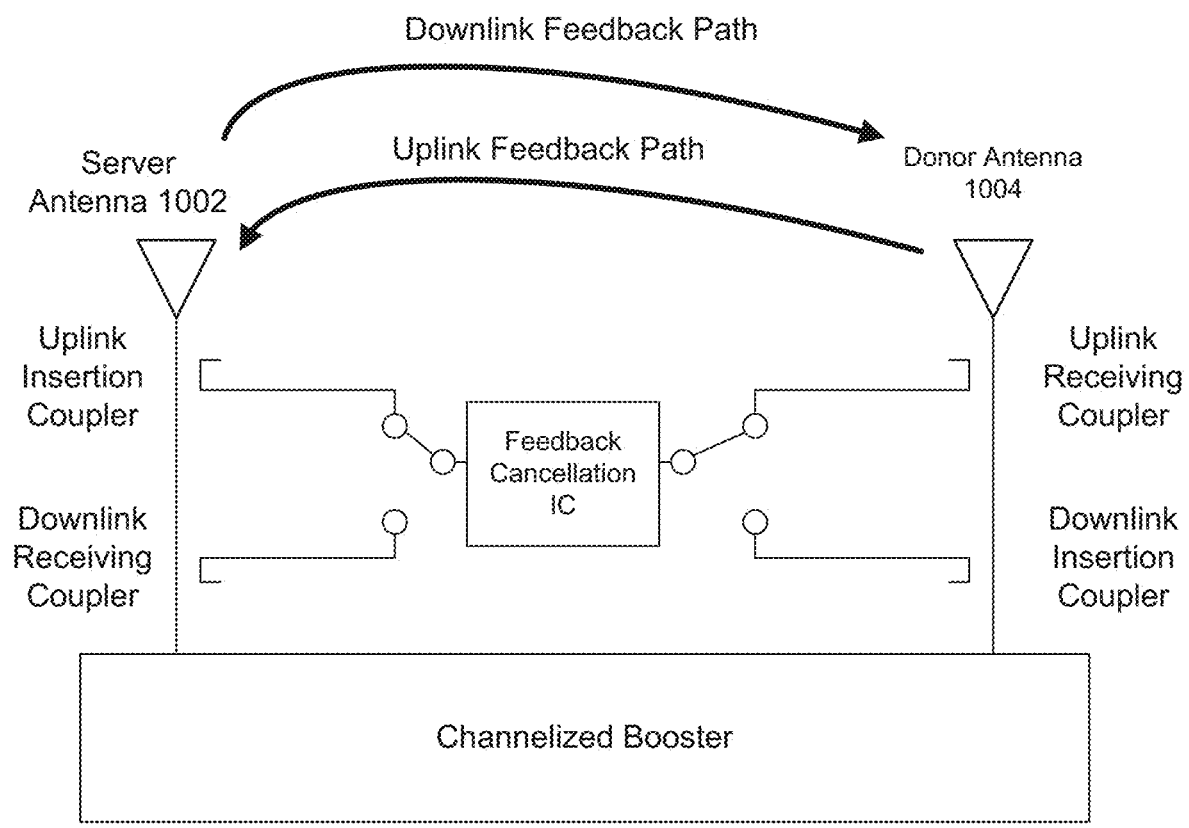
FIG. 10 illustrates a bi-directional repeater system with feedback cancellation in accordance with an example.

In another example, as illustrated in FIG. 10, the repeater can be a TDD system. A bi-directional repeater system can comprise a signal booster or channelized booster connected to an outside antenna 1004 or donor antenna 1004 and an inside antenna 1002 or server antenna 1002. The bi-directional repeater system can further comprise: a first direction amplification and filtering path coupled between the server antenna port and the donor antenna port; and a second-direction amplification and filtering path coupled between the server antenna port and the donor antenna port. A first duplexer can be coupled between the server antenna port and the first-direction amplification path and the second-direction amplification path; and a second duplexer can be coupled between the donor antenna port and the first-direction amplification path and the second-direction amplification path.

A single feedback cancellation IC can be used by switching the coupling direction. A time division duplex (TDD) two-antenna radio frequency (RF) feedback cancellation integrated circuit (IC) can be coupled between the server antenna port and the donor antenna port. An uplink insertion coupler can feed a first-direction signal to the TDD two-antenna RF feedback cancellation IC. A first-direction cancellation signal can be generated at the TDD two-antenna RF feedback cancellation IC and coupled onto the uplink receiving coupler. The first-direction cancellation signal can reduce antenna-to-antenna feedback for a single band in a first direction between the donor antenna 1004 and the server antenna 1002 by reducing antenna-to-antenna feedback along the uplink feedback path.

In another example, a downlink insertion coupler can feed a second-direction signal to the TDD two-antenna RF feedback cancellation integrated circuit (IC). A second-direction cancellation signal can be generated at the TDD two-antenna RF feedback cancellation IC and coupled onto the downlink receiving coupler. The second-direction cancellation signal can reduce antenna-to-antenna feedback for a single band in a second direction between the donor antenna 1004 and the server antenna 1002 by reducing antenna-to-antenna feedback along the downlink feedback path.

In another example, the TDD two-antenna RF feedback cancellation circuit can be switchably coupled to the first-direction amplification and filtering path and the second-direction amplification and filtering path.

Figure 11:
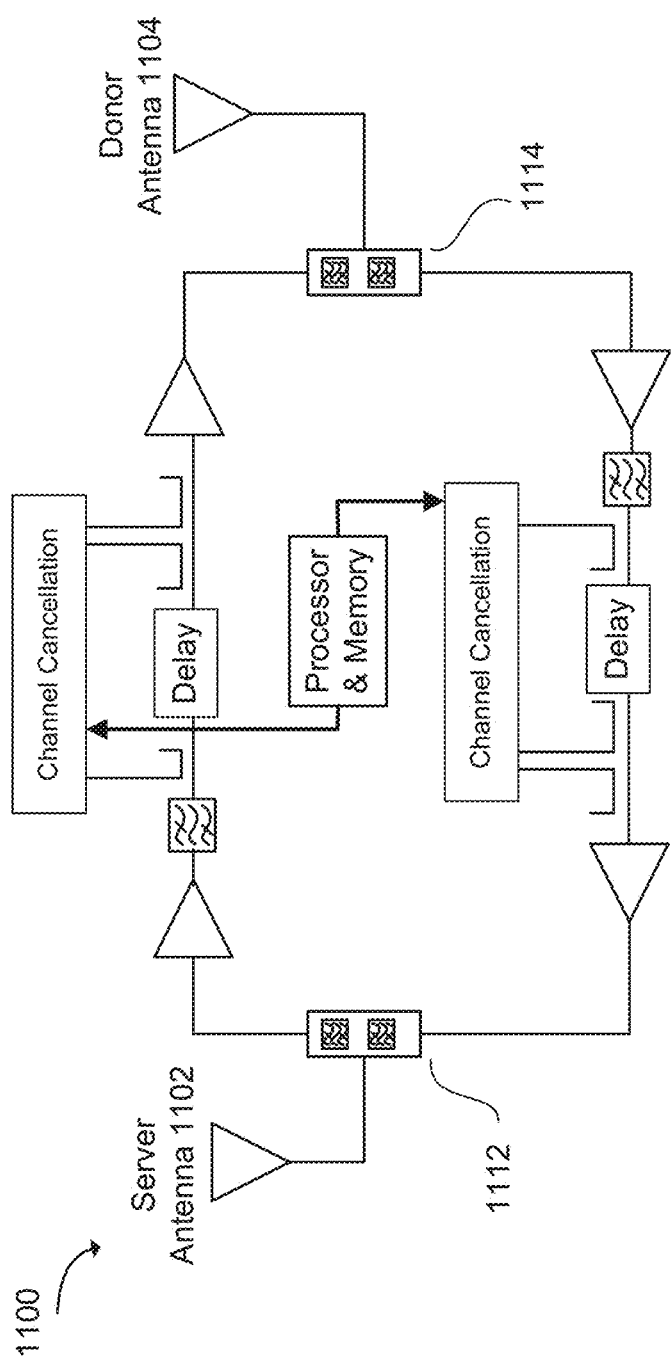
FIG. 11 illustrates a bi-directional repeater system with channel cancellation in accordance with an example.

In another example, FIG. 11 illustrates a bi-directional repeater system with channel cancellation. The bi-directional repeater system can comprise an outside antenna 1104 or donor antenna 1104 and an inside antenna 1102 or server antenna 1102. The outside antenna 1104 or donor antenna 1104 can be connected to a donor antenna port. The inside antenna 1102 or server antenna 1102 can be connected to a server antenna port. The bi-directional repeater system can further comprise: a first direction amplification and filtering path for a first-direction signal, wherein the first direction amplification and filtering path is coupled between the server antenna port and the donor antenna port; and a second-direction amplification and filtering path for a second-direction signal, wherein the second-direction amplification and filtering path is coupled between the server antenna port and the donor antenna port. A first duplexer 1112 can be coupled between the server antenna port and the first-direction amplification path and the second-direction amplification path; and a second duplexer 1114 can be coupled between the donor antenna port and the first-direction amplification path and the second-direction amplification path.

In another example, the bi-directional repeater system can further comprise a first-direction low noise amplifier coupled to the first duplexer 1112 and a second-direction low-noise amplifier coupled to the second duplexer 1114. A first-direction power amplifier can be coupled to a port of the second duplexer on the first-direction amplification and filtering path. A second-direction power amplifier can be coupled to a port of the first duplexer on the second-direction amplification and filtering path.

In another example, a first bandpass filter can be coupled to an output of the first-direction low-noise amplifier, wherein the first bandpass filter is configured to output a first-direction band signal comprising a plurality of first-direction channels. In another example, a second bandpass filter can be coupled to an output of the second-direction low-noise amplifier, wherein the second bandpass filter is configured to output a second-direction band signal comprising a plurality of second-direction channels.

In another example, a first-direction channel cancellation circuit can be coupled between the server antenna port 1102 and the donor antenna port 1104 to reduce an amplitude of a first-direction selected channel in the first-direction signal. In another example, a second-direction channel cancellation circuit can be coupled between the server antenna port 1102 and the donor antenna port 1104 to reduce an amplitude of a second-direction selected channel in the second-direction signal.

In another example, the first-direction channel cancellation circuit can be configured to couple the first-direction band signal output from the first bandpass filter. The first-direction channel cancellation circuit can be configured to couple one or more selected channels of the plurality of first-direction channels. The first-direction channel cancellation circuit can be configured to inject a first-direction channel cancellation signal into the first-direction band signal to reduce an amplitude of the one or more selected channels to form a first-direction channelized signal. Cancellation of the signal between the amplifiers can minimize linear and non-linear impairments, which can result in a more simplified cancellation configuration.

In another example, the second-direction channel cancellation circuit can be configured to couple the second-direction band signal output from the second bandpass filter. The second-direction channel cancellation circuit can be configured to couple one or more selected channels of the plurality of second-direction channels. The second-direction channel cancellation circuit can be configured to inject a second-direction channel cancellation signal into the second-direction band signal to reduce an amplitude of the one or more selected channels to form a second-direction channelized signal. Cancellation of the signal between the amplifiers can minimize linear and non-linear impairments, which can result in a more simplified cancellation configuration.

In another example, a first-direction signal delay can be located between the coupling of the first-direction band signal and the injection of the first-direction channel cancellation signal. In another example, a second-direction signal delay can be located between the coupling of the second-direction band signal and the injection of the second-direction channel cancellation signal.

In another example, the amplitude of the first-direction selected channel can be reduced by greater than 20 decibels (dB). In another example, the amplitude of the second-direction selected channel can be reduced by greater than 20 decibels (dB). Reducing the amplitude of the first-direction selected channel or the second-direction selected channel by 20 dB or greater can improve near-far performance.

In another example, the amplitude of the first-direction selected channel can be reduced by greater than 30 decibels (dB). In another example, the amplitude of the second-direction selected channel can be reduced by greater than 30 decibels (dB). Reducing the amplitude of the first-direction selected channel or the second-direction selected channel by 30 dB or greater can improve near-far performance.

In another example, the amplitude of the first-direction selected channel can be greater than an amplitude of other channels in the first-direction signal. In another example, the amplitude of the second-direction selected channel can be greater than an amplitude of other channels in the second-direction signal.

In another example, the bi-directional repeater system can further comprise one or more processors and memory. The one or more processors and memory can interface with the first-direction channel cancellation circuit and the second-direction channel cancellation circuit.

In another example, a first uplink insertion coupler can sample a first-direction signal at an output of the first bandpass filter. In another example, a second uplink insertion coupler can sample a signal at an input of the first-direction power amplifier. In another example, an uplink receiving coupler can inject a first-direction channel cancellation signal at an output of a first-direction signal delay.

In another example, a first downlink insertion coupler can sample a second-direction signal at an output of the second bandpass filter. In another example, a second downlink insertion coupler can sample a signal at an input of the second-direction power amplifier. In another example, a downlink receiving coupler can inject a second-direction channel cancellation signal at an output of a second-direction signal delay.

Figure 12A:
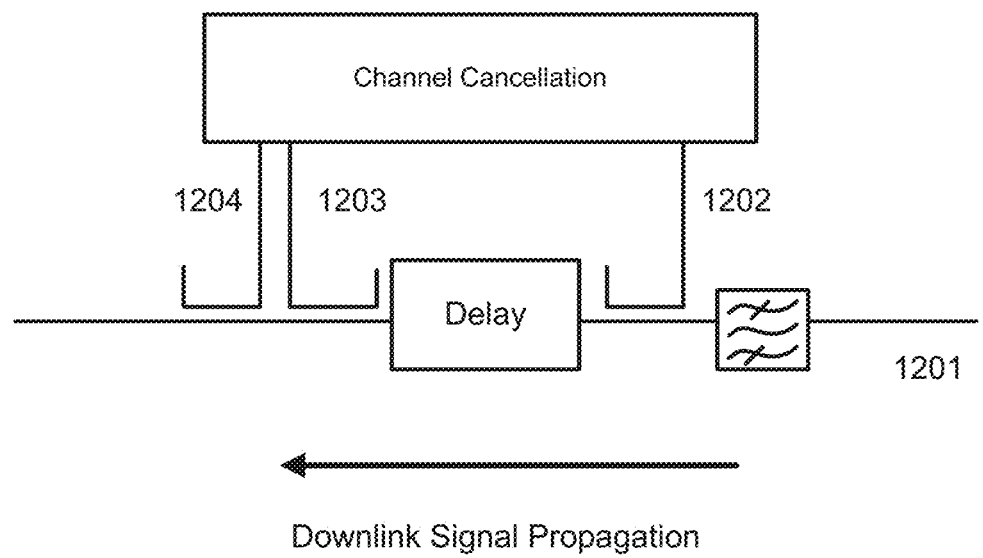
FIG. 12a illustrates channel cancellation in accordance with an example.

In another example, FIG. 12*a* illustrates channel cancellation. In this example, a signal 1201 can be wideband noise entering a booster path that is directed to a bandpass filter. A signal 1202 can be a bandlimited cellular band signal that is directed to a channel cancellation circuit. The channel cancellation circuit can be configured to generate a desired channel signal in the bandlimited cellular band to cancel thereby forming a channel cancellation signal. The channel cancellation signal 1203 can be directed to a receiving coupler. The bandlimited cellular band signal with cancelled signal 1204 can be directed back to the channel cancellation circuit.

Figure 12B:
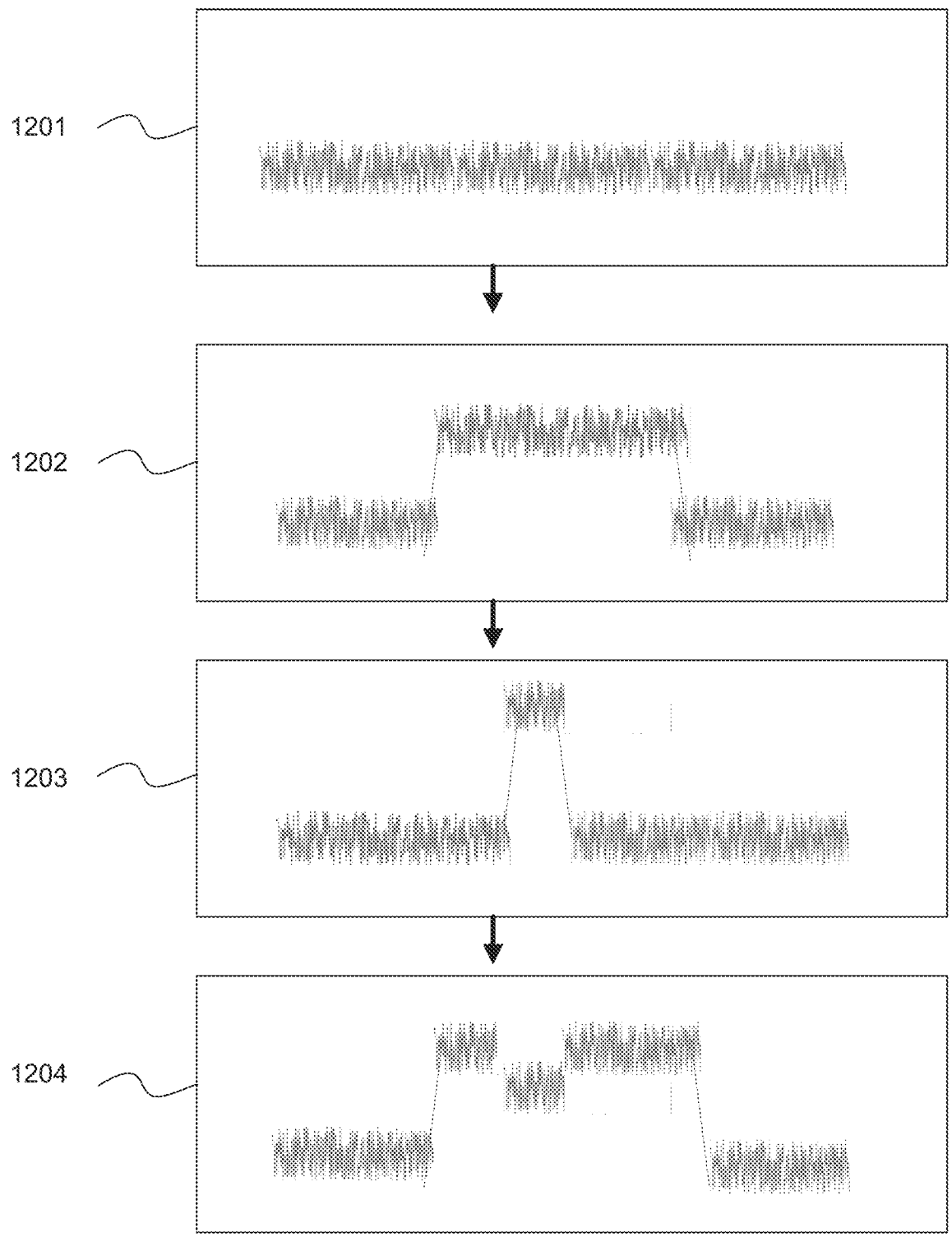
FIG. 12b illustrates channel cancellation in accordance with an example.

In another example, FIG. 12*b* illustrates channel cancellation. In this example, wideband noise entering a booster path can have the frequency characteristics as shown in block 1201. In this example, the bandlimited cellular band signal at the output of the band filter can have can have the frequency characteristics as shown in block 1202. In this example, the desired channel signal in the cellular band to cancel can have the frequency characteristics as shown in block 1203. In this example, the bandlimited cellular band signal with cancelled signal can have the frequency characteristics as shown in block 1204.

Figure 13:
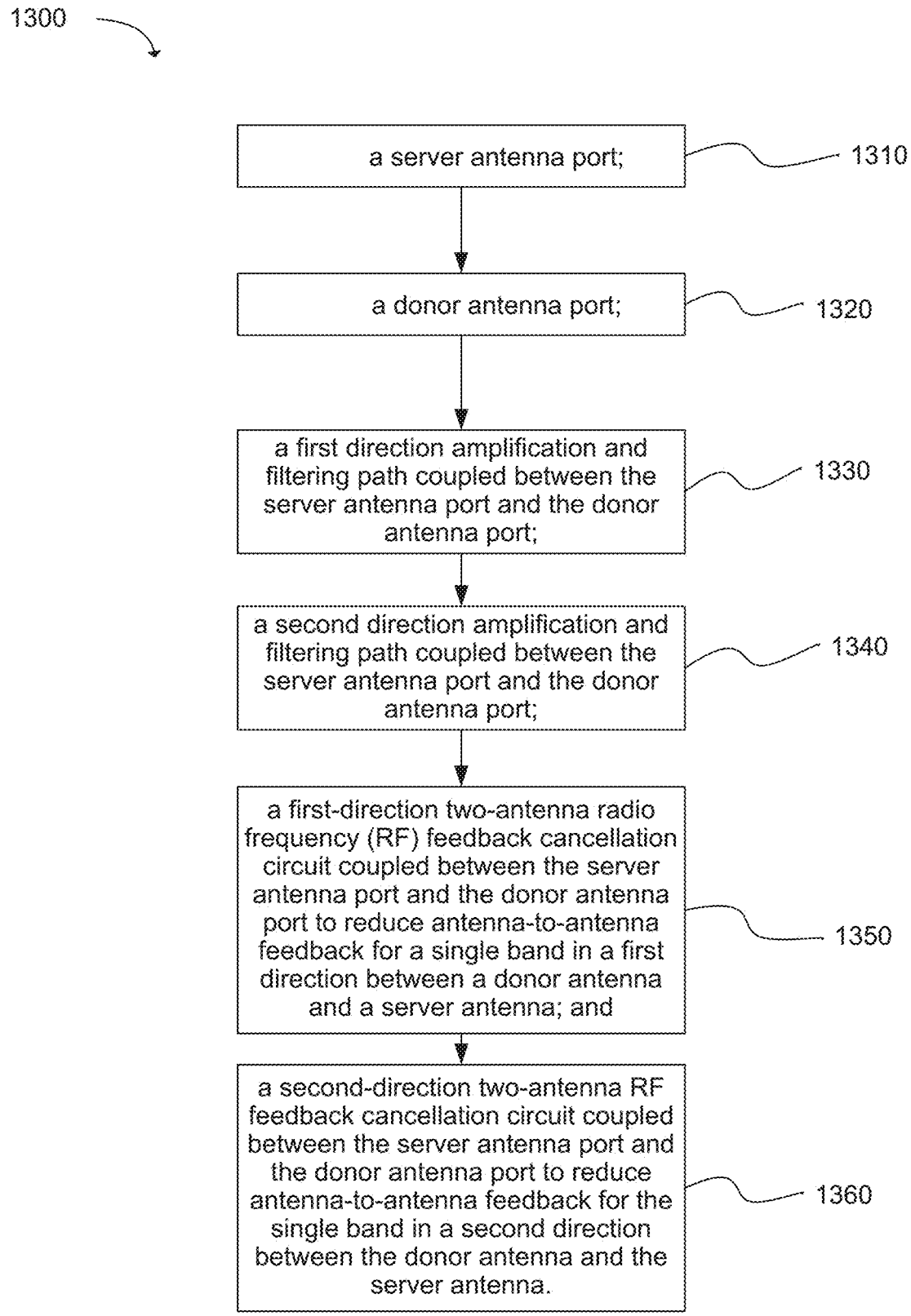
FIG. 13 depicts a repeater with feedback cancellation in accordance with an example.

Another example provides a repeater 1300, as shown in the flow chart in FIG. 13. The repeater can comprise a server antenna port, as shown in block 1310. The repeater can further comprise a donor antenna port, as shown in block 1320. The repeater can further comprise a first direction amplification and filtering path coupled between the server antenna port and the donor antenna port, as shown in block 1330. The repeater can further comprise a second direction amplification and filtering path coupled between the server antenna port and the donor antenna port, as shown in block 1340. The repeater can further comprise a first-direction two-antenna feedback cancellation circuit coupled between the server antenna port and the donor antenna port to reduce antenna-to-antenna feedback for a single band in a first direction between a donor antenna and a server antenna, as shown in block 1350. The repeater can further comprise a second-direction two-antenna feedback cancellation circuit coupled between the server antenna port and the donor antenna port to reduce antenna-to-antenna feedback for the single band in a second direction between the donor antenna and the server antenna, as shown in block 1360.

Figure 14:
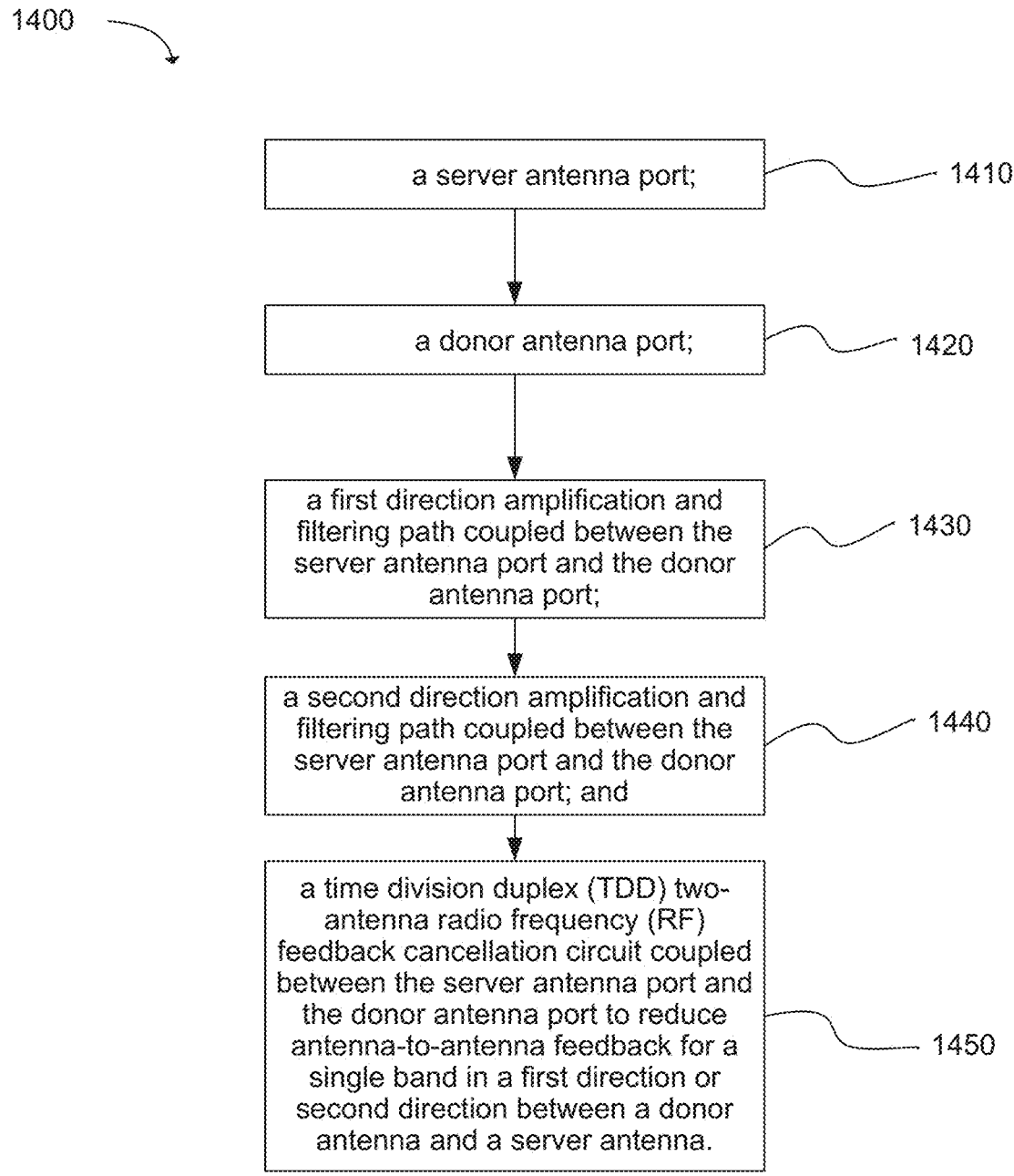
FIG. 14 depicts a repeater with feedback cancellation in accordance with an example.

Another example provides a repeater 1400, as shown in the flow chart in FIG. 14. The repeater can comprise a server antenna port as shown in block 1410. The repeater can further comprise a donor antenna port, as shown in block 1420. The repeater can further comprise a first direction amplification and filtering path coupled between the server antenna port and the donor antenna port, as shown in block 1430. The repeater can further comprise a second direction amplification and filtering path coupled between the server antenna port and the donor antenna port, as shown in block 1440. The repeater can further comprise a time division duplex (TDD) two-antenna radio frequency (RF) feedback cancellation circuit coupled between the server antenna port and the donor antenna port to reduce antenna-to-antenna feedback for a single band in a first direction or second direction between a donor antenna and a server antenna, as shown in block 1450.

Figure 15:
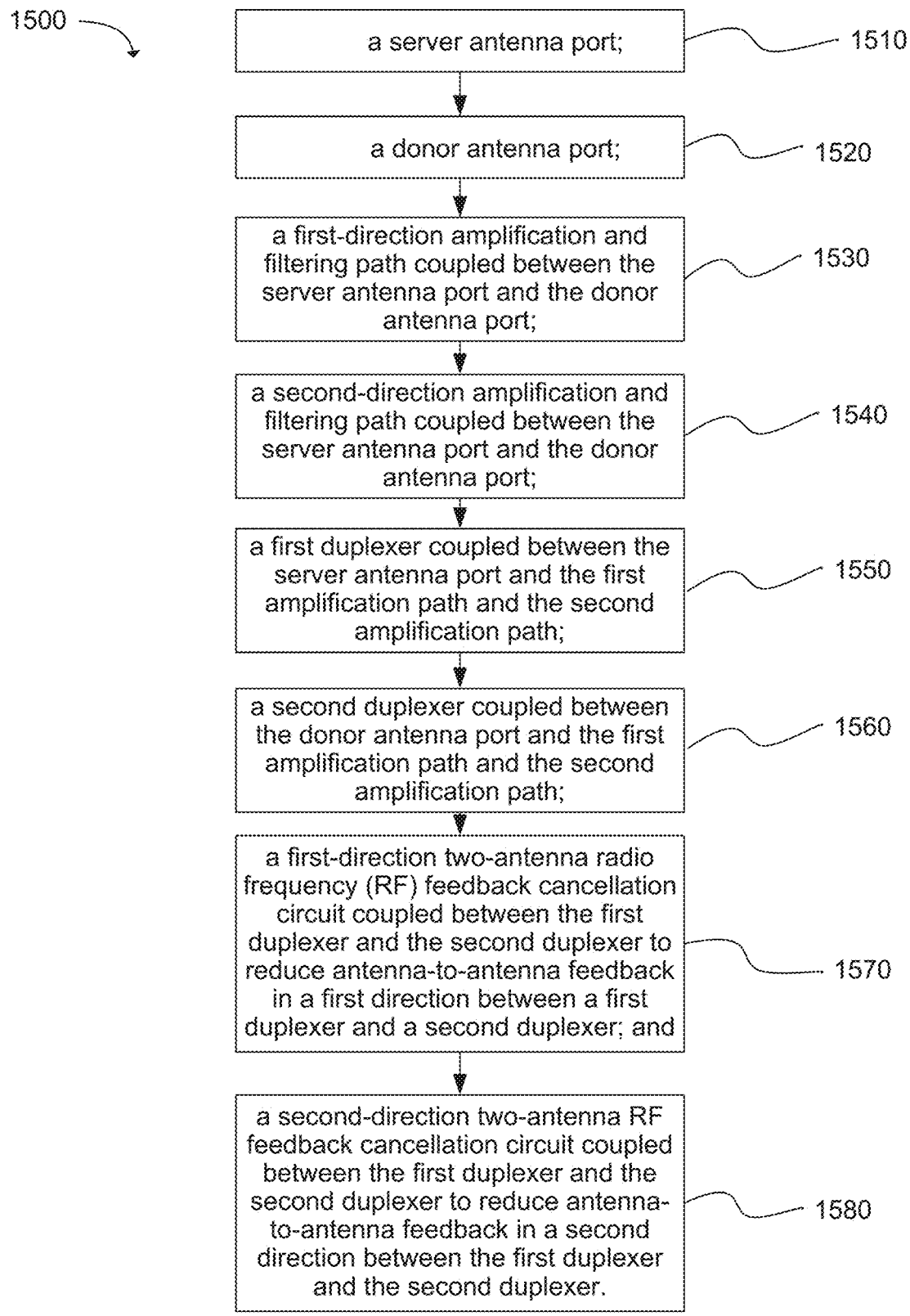
FIG. 15 depicts a repeater with feedback cancellation in accordance with an example.

Another example provides a repeater 1500, as shown in the flow chart in FIG. 15. The repeater can comprise a server antenna port, as shown in block 1510. The repeater can further comprise a donor antenna port, as shown in block 1520. The repeater can further comprise a first-direction amplification and filtering path coupled between the server antenna port and the donor antenna port, as shown in block 1530. The repeater can further comprise a second-direction amplification and filtering path coupled between the server antenna port and the donor antenna port, as shown in block 1540. The repeater can further comprise a first duplexer coupled between the server antenna port and the first amplification path and the second amplification path, as shown in block 1550. The repeater can further comprise a second duplexer coupled between the donor antenna port and the first amplification path and the second amplification path, as shown in block 1560. The repeater can further comprise a first-direction two-antenna radio frequency (RF) feedback cancellation circuit coupled between the first duplexer and the second duplexer to reduce antenna-to-antenna feedback in a first direction between a first duplexer and a second duplexer, as shown in block 1570. The repeater can further comprise a second-direction two-antenna RF feedback cancellation circuit coupled between the first duplexer and the second duplexer to reduce antenna-to-antenna feedback in a second direction between the first duplexer and the second duplexer, as shown in block 1580.

Figure 16:
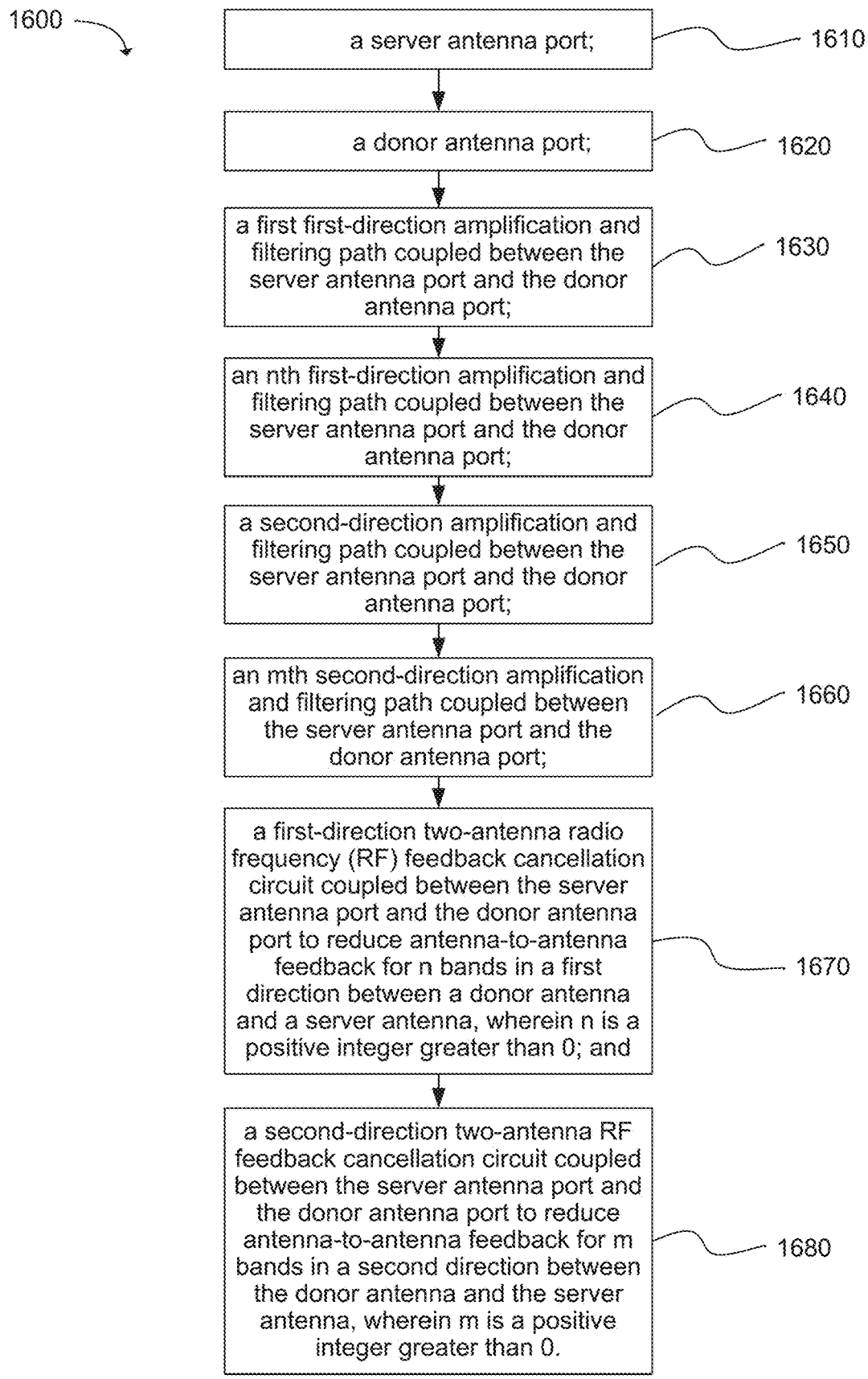
FIG. 16 depicts a multiband repeater with feedback cancellation in accordance with an example.

Another example provides a repeater 1600, as shown in the flow chart in FIG. 16. The repeater can comprise a server antenna port, as shown in block 1610. The repeater can further comprise a donor antenna port, as shown in block 1620. The repeater can further comprise a first first-direction amplification and filtering path coupled between the server antenna port and the donor antenna port, as shown in block 1630. The repeater can further comprise an nth first-direction amplification and filtering path coupled between the server antenna port and the donor antenna port, as shown in block 1640. The repeater can further comprise a second-direction amplification and filtering path coupled between the server antenna port and the donor antenna port, as shown in block 1650. The repeater can further comprise an mth second-direction amplification and filtering path coupled between the server antenna port and the donor antenna port, as shown in block 1660. The repeater can further comprise a first-direction two-antenna radio frequency (RF) feedback cancellation circuit coupled between the server antenna port and the donor antenna port to reduce antenna-to-antenna feedback for n bands in a first direction between a donor antenna and a server antenna, wherein n is a positive integer greater than 0, as shown in block 1670. The repeater can further comprise a second-direction two-antenna RF feedback cancellation circuit coupled between the server antenna port and the donor antenna port to reduce antenna-to-antenna feedback for m bands in a second direction between the donor antenna and the server antenna, wherein m is a positive integer greater than 0, as shown in block 1680.

Figure 17:
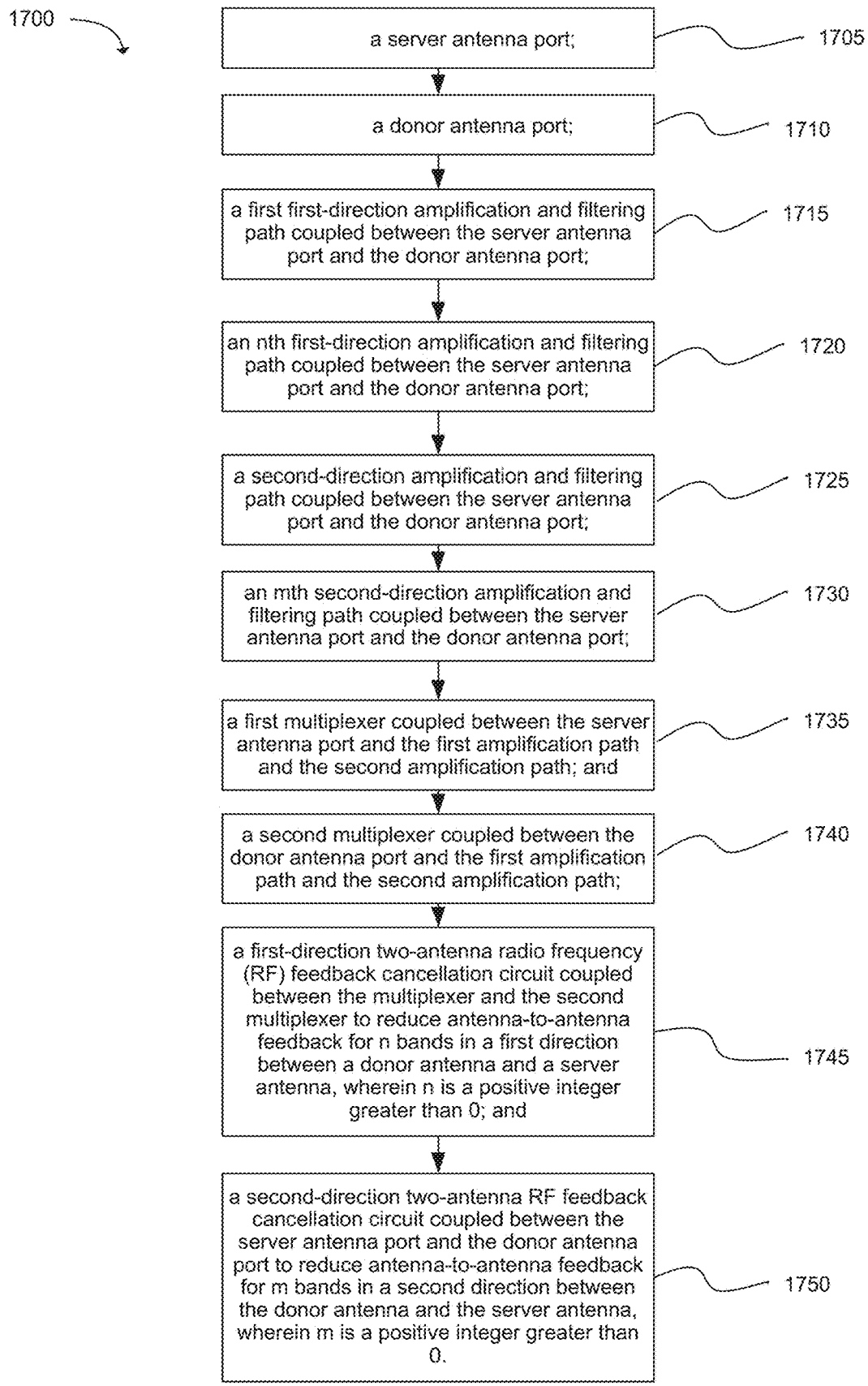
FIG. 17 depicts a multiband repeater with feedback cancellation in accordance with an example.

Another example provides a repeater 1700, as shown in the flow chart in FIG. 17. The repeater can comprise a server antenna port, as shown in block 1705. The repeater can further comprise a donor antenna port, as shown in block 1710. The repeater can further comprise a first first-direction amplification and filtering path coupled between the server antenna port and the donor antenna port, as shown in block 1715. The repeater can further comprise an nth first-direction amplification and filtering path coupled between the server antenna port and the donor antenna port, as shown in block 1720. The repeater can further comprise a second-direction amplification and filtering path coupled between the server antenna port and the donor antenna port, as shown in block 1725. The repeater can further comprise an mth second-direction amplification and filtering path coupled between the server antenna port and the donor antenna port, as shown in block 1730. The repeater can further comprise a first multiplexer coupled between the server antenna port and the first amplification path and the second amplification path, as shown in block 1735. The repeater can further comprise a second multiplexer coupled between the donor antenna port and the first amplification path and the second amplification path, as shown in block 1740. The repeater can further comprise a first-direction two-antenna radio frequency (RF) feedback cancellation circuit coupled between the multiplexer and the second multiplexer to reduce antenna-to-antenna feedback for n bands in a first direction between a donor antenna and a server antenna, wherein n is a positive integer greater than 0, as shown in block 1745. The repeater can further comprise a second-direction two-antenna RF feedback cancellation circuit coupled between the server antenna port and the donor antenna port to reduce antenna-to-antenna feedback for m bands in a second direction between the donor antenna and the server antenna, wherein m is a positive integer greater than 0, as shown in block 1750.

Figure 18:
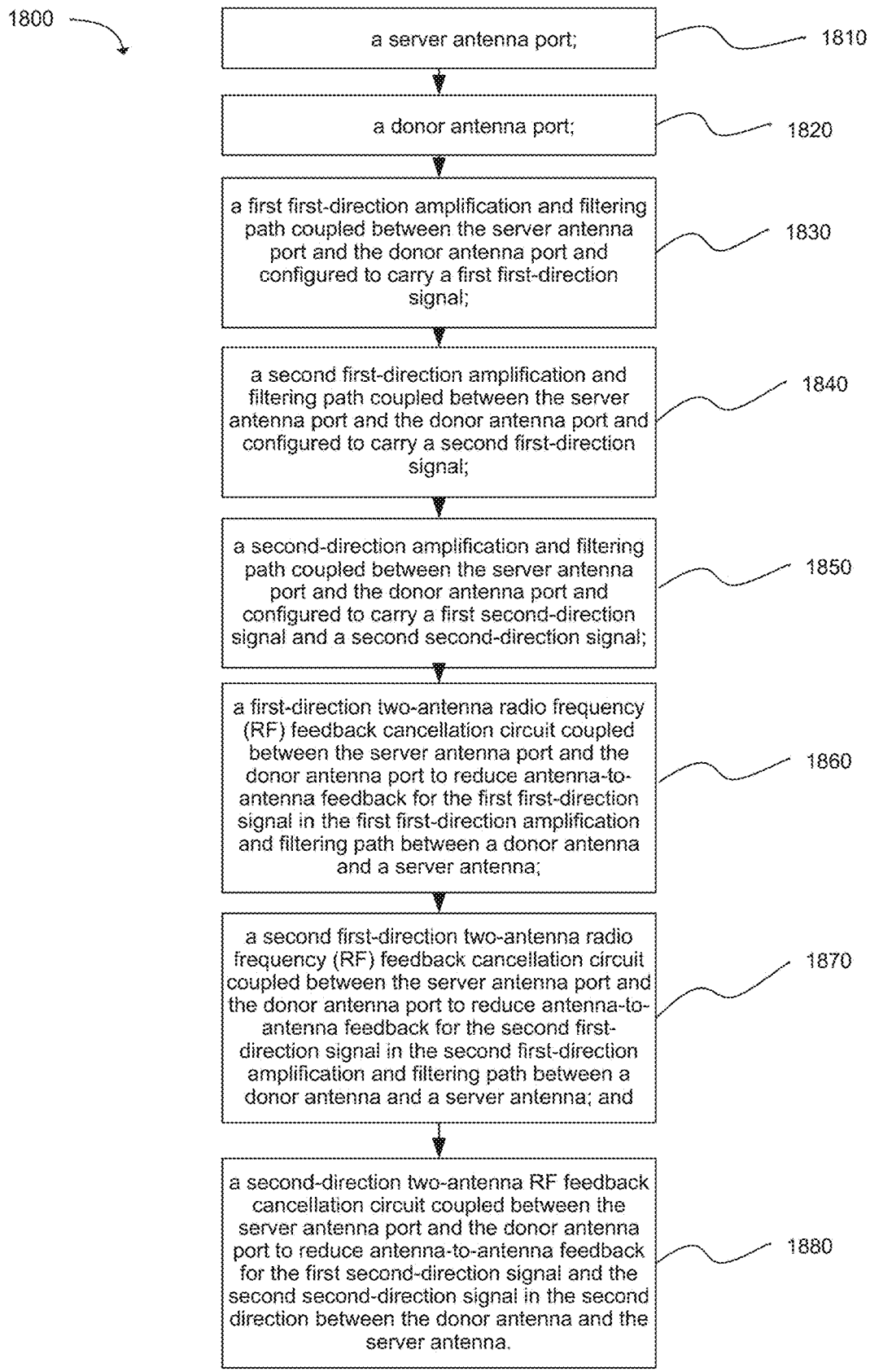
FIG. 18 depicts a multiband repeater with feedback cancellation in accordance with an example.

Another example provides a repeater 1800, as shown in the flow chart in FIG. 18. The repeater can comprise a server antenna port, as shown in block 1810. The repeater can further comprise a donor antenna port, as shown in block 1820. The repeater can further comprise a first first-direction amplification and filtering path coupled between the server antenna port and the donor antenna port and configured to carry a first first-direction signal, as shown in block 1830. The repeater can further comprise a second first-direction amplification and filtering path coupled between the server antenna port and the donor antenna port and configured to carry a second first-direction signal, as shown in block 1840. The repeater can further comprise a second-direction amplification and filtering path coupled between the server antenna port and the donor antenna port and configured to carry a first second-direction signal and a second second-direction signal, as shown in block 1850. The repeater can further comprise a first-direction two-antenna radio frequency (RF) feedback cancellation circuit coupled between the server antenna port and the donor antenna port to reduce antenna-to-antenna feedback for the first first-direction signal in the first first-direction amplification and filtering path between a donor antenna and a server antenna, as shown in block 1860. The repeater can further comprise a second first-direction two-antenna radio frequency (RF) feedback cancellation circuit coupled between the server antenna port and the donor antenna port to reduce antenna-to-antenna feedback for the second first-direction signal in the second first-direction amplification and filtering path between a donor antenna and a server antenna, as shown in block 1870. The repeater can further comprise a second-direction two-antenna RF feedback cancellation circuit coupled between the server antenna port and the donor antenna port to reduce antenna-to-antenna feedback for the first second-direction signal and the second second-direction signal in the second direction between the donor antenna and the server antenna, as shown in block 1880.

Figure 19:
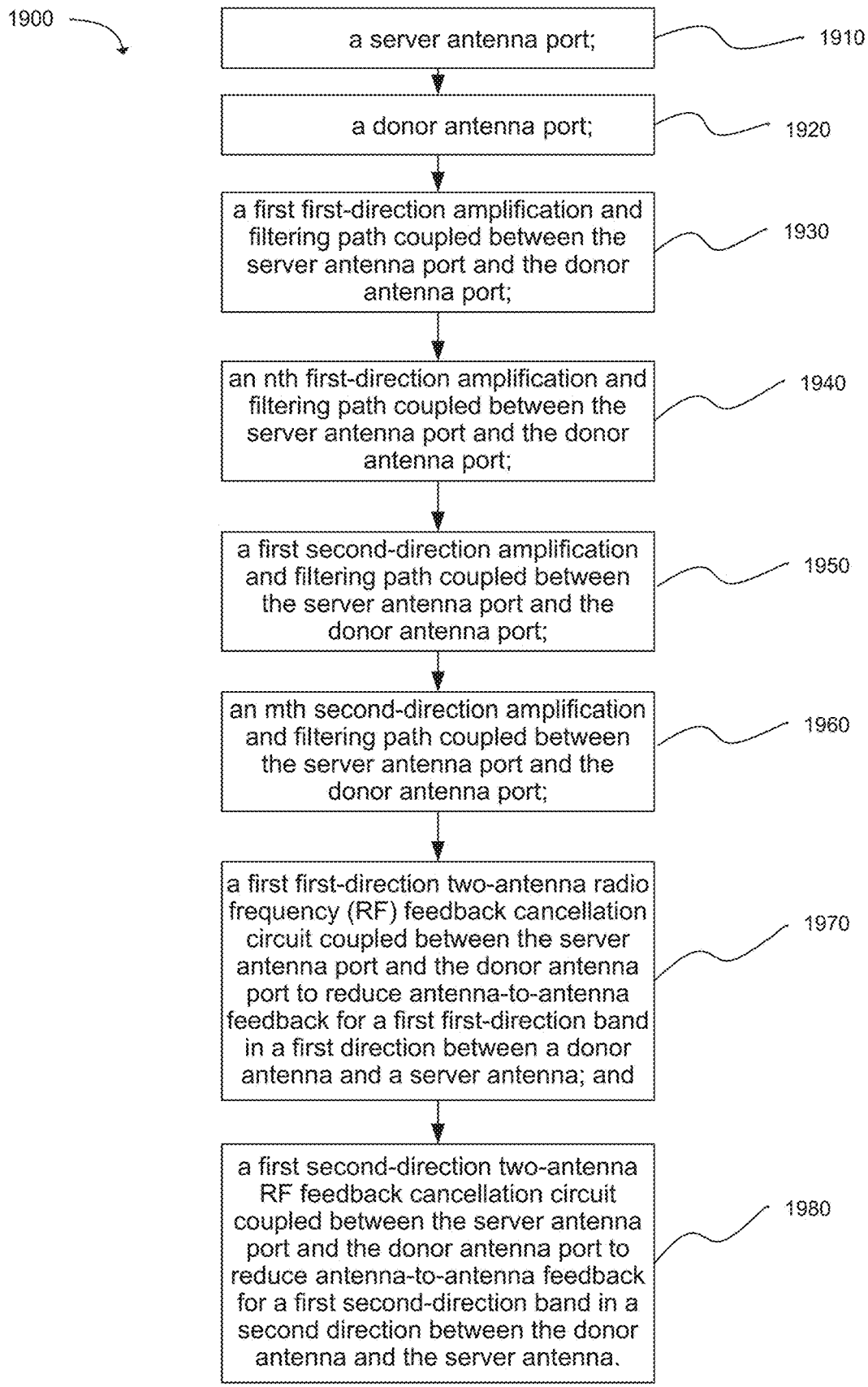
FIG. 19 depicts a multiband repeater with feedback cancellation in accordance with an example.

Another example provides a repeater 1900, as shown in the flow chart in FIG. 19. The repeater can comprise a server antenna port, as shown in block 1910. The repeater can further comprise a donor antenna port, as shown in block 1920. The repeater can further comprise a first first-direction amplification and filtering path coupled between the server antenna port and the donor antenna port, as shown in block 1930. The repeater can further comprise an nth first-direction amplification and filtering path coupled between the server antenna port and the donor antenna port, as shown in block 1940. The repeater can further comprise a first second-direction amplification and filtering path coupled between the server antenna port and the donor antenna port, as shown in block 1950. The repeater can further comprise an mth second-direction amplification and filtering path coupled between the server antenna port and the donor antenna port, as shown in block 1960. The repeater can further comprise a first first-direction two-antenna radio frequency (RF) feedback cancellation circuit coupled between the server antenna port and the donor antenna port to reduce antenna-to-antenna feedback for a first first-direction band in a first direction between a donor antenna and a server antenna, as shown in block 1970. The repeater can further comprise a first second-direction two-antenna RF feedback cancellation circuit coupled between the server antenna port and the donor antenna port to reduce antenna-to-antenna feedback for a first second-direction band in a second direction between the donor antenna and the server antenna, as shown in block 1980.

Figure 20:
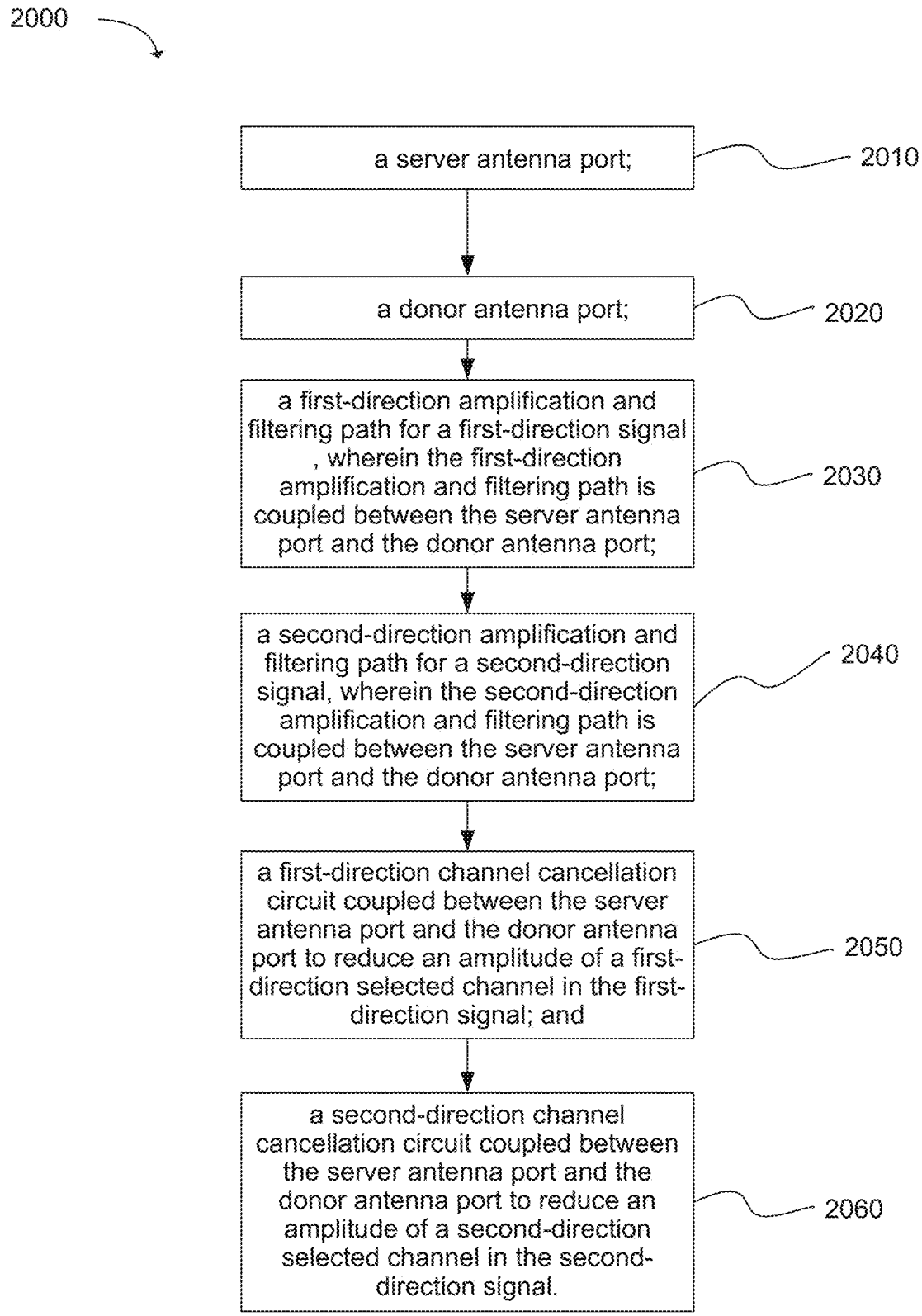
FIG. 20 depicts a repeater with channel cancellation in accordance with an example.

Another example provides a repeater 2000, as shown in the flow chart in FIG. 20. The repeater can comprise a server antenna port, as shown in block 2010. The repeater can further comprise a donor antenna port, as shown in block 2020. The repeater can further comprise a first-direction amplification and filtering path for a first-direction signal, wherein the first-direction amplification and filtering path is coupled between the server antenna port and the donor antenna port, as shown in block 2030. The repeater can further comprise a second-direction amplification and filtering path for a second-direction signal, wherein the second-direction amplification and filtering path is coupled between the server antenna port and the donor antenna port, as shown in block 2040. The repeater can further comprise a first-direction channel cancellation circuit coupled between the server antenna port and the donor antenna port to reduce an amplitude of a first-direction selected channel in the first-direction signal, as shown in block 2050. The repeater can further comprise a second-direction channel cancellation circuit coupled between the server antenna port and the donor antenna port to reduce an amplitude of a second-direction selected channel in the second-direction signal, as shown in block 2060.

EXAMPLES

The following examples pertain to specific technology embodiments and point out specific features, elements, or actions that can be used or otherwise combined in achieving such embodiments.

Example 1 includes a repeater comprising: a server antenna port; a donor antenna port; a first direction amplification and filtering path coupled between the server antenna port and the donor antenna port; a second direction amplification and filtering path coupled between the server antenna port and the donor antenna port; a first-direction two-antenna radio frequency (RF) feedback cancellation circuit coupled between the server antenna port and the donor antenna port to reduce antenna-to-antenna feedback for a single band in a first direction between a donor antenna and a server antenna; and a second-direction two-antenna RF feedback cancellation circuit coupled between the server antenna port and the donor antenna port to reduce antenna-to-antenna feedback for the single band in a second direction between the donor antenna and the server antenna.

Example 2 includes the repeater of Example 1 further comprising: a first duplexer coupled between the server antenna port and the first amplification path and the second amplification path; and a second duplexer coupled between the donor antenna port and the first amplification path and the second amplification path.

Example 3 includes the repeater of any of Examples 1 to 2, further comprising: a first-direction two-antenna RF feedback cancellation circuit coupled between the first duplexer and the second duplexer to reduce antenna-to-antenna feedback in a first direction between a first duplexer and a second duplexer; and a second-direction two-antenna RF feedback cancellation circuit coupled between the first duplexer and the second duplexer to reduce antenna-to-antenna feedback in a second direction between the first duplexer and the second duplexer.

Example 4 includes the repeater of any of Examples 1 to 3, further comprising: an nth first direction amplification and filtering path coupled between the server antenna port and the donor antenna port; and an mth second direction amplification and filtering path coupled between the server antenna port and the donor antenna port.

Example 5 includes the repeater of any of Examples 1 to 4, further comprising: n additional first-direction two-antenna RF feedback cancellation circuit coupled between the server antenna port and the donor antenna port to reduce antenna-to-antenna feedback for each of n bands in a first direction between a donor antenna and a server antenna; and m additional second-direction two-antenna RF feedback cancellation circuit coupled between the server antenna port and the donor antenna port to reduce antenna-to-antenna feedback for each of m bands in a second direction between the donor antenna and the server antenna.

Example 6 includes the repeater of any of Examples 1 to 5, further comprising: n additional first-direction two-antenna RF feedback cancellation circuits coupled between the first duplexer and the second duplexer to reduce antenna-to-antenna feedback for each of n bands in a first direction between the first duplexer and the second duplexer; and m additional second-direction two-antenna RF feedback cancellation circuits coupled between the first duplexer and the second duplexer to reduce antenna-to-antenna feedback for each of m bands in a second direction between the first duplexer and the second duplexer.

Example 7 includes the repeater of any of Examples 1 to 6, further comprising: an additional first-direction two-antenna RF feedback cancellation circuit coupled between the server antenna port and the donor antenna port to reduce antenna-to-antenna feedback for an additional band in a first direction between a donor antenna and a server antenna, and wherein the second-direction two-antenna RF feedback cancellation circuit coupled between the server antenna port and the donor antenna port is configured to reduce antenna-to-antenna feedback for multiple bands in a second direction between the donor antenna and the server antenna.

Example 8 includes the repeater of any of Examples 1 to 7, further comprising: a first-direction low-noise amplifier and a first-direction power amplifier, wherein the first-direction two-antenna RF feedback cancellation circuit is configured to sample a first-direction signal at an output of the first-direction power amplifier and inject a first-direction cancellation signal at an output of the first-direction low-noise amplifier; and a second-direction low-noise amplifier and a second-direction power amplifier, wherein the second-direction two-antenna RF feedback cancellation circuit is configured to sample a second-direction signal at an output of the second-direction power amplifier and inject a second-direction cancellation signal at an output of the second-direction low-noise amplifier.

Example 9 includes the repeater of any of Examples 1 to 8, further comprising: a first-direction low-noise amplifier and a first-direction power amplifier, wherein the first-direction two-antenna RF feedback cancellation circuit is configured to sample a first-direction signal at an input of the first-direction power amplifier and inject a first-direction cancellation signal at an input of the first-direction low-noise amplifier or at an output of the first-direction low-noise amplifier; and a second-direction low-noise amplifier and a second-direction power amplifier, wherein the second-direction two-antenna RF feedback cancellation circuit is configured to sample a second-direction signal at an input of the second-direction power amplifier and inject a second-direction cancellation signal at an input of the second-direction low-noise amplifier or at an output of the second-direction low-noise amplifier.

Example 10 includes the repeater of any of Examples 1 to 9, wherein the repeater is configured for one or more of frequency division duplex (FDD) signals or time division duplex (TDD) signals.

Example 11 includes a repeater comprising: a server antenna port; a donor antenna port; a first direction amplification and filtering path coupled between the server antenna port and the donor antenna port; a second direction amplification and filtering path coupled between the server antenna port and the donor antenna port; and a time division duplex (TDD) two-antenna radio frequency (RF) feedback cancellation circuit coupled between the server antenna port and the donor antenna port to reduce antenna-to-antenna feedback for a single band in a first direction or second direction between a donor antenna and a server antenna.

Example 12 includes the repeater of Example 11, wherein the TDD two-antenna radio frequency (RF) feedback cancellation circuit is switchably coupled to the first direction amplification and filtering path and the second direction amplification and filtering path.

Example 13 includes a repeater comprising: a server antenna port; a donor antenna port; a first-direction amplification and filtering path coupled between the server antenna port and the donor antenna port; a second-direction amplification and filtering path coupled between the server antenna port and the donor antenna port; a first duplexer coupled between the server antenna port and the first amplification path and the second amplification path; a second duplexer coupled between the donor antenna port and the first amplification path and the second amplification path; a first-direction two-antenna radio frequency (RF) feedback cancellation circuit coupled between the first duplexer and the second duplexer to reduce antenna-to-antenna feedback in a first direction between a first duplexer and a second duplexer; and a second-direction two-antenna RF feedback cancellation circuit coupled between the first duplexer and the second duplexer to reduce antenna-to-antenna feedback in a second direction between the first duplexer and the second duplexer.

Example 14 includes the repeater of Example 13, further comprising: a first-direction low noise amplifier (LNA) coupled between the first duplexer and the first-direction two-antenna RF feedback cancellation circuit; a first-direction power amplifier (PA) coupled between the second duplexer and the first-direction LNA; wherein the first-direction two-antenna RF feedback cancellation circuit is configured to sample a first-direction signal at an output of the first-direction power amplifier and inject a first-direction cancellation signal at an output of the first-direction low-noise amplifier; a second-direction low noise amplifier (LNA) coupled between the second duplexer and the second-direction two-antenna RF feedback cancellation circuit; and a second-direction power amplifier (PA) coupled between the first duplexer and the second-direction LNA; wherein the second-direction two-antenna RF feedback cancellation circuit is configured to sample a second-direction signal at an output of the second-direction power amplifier and inject a second-direction cancellation signal at an output of the second-direction low-noise amplifier.

Example 15 includes a multiband repeater comprising: a server antenna port; a donor antenna port; a first first-direction amplification and filtering path coupled between the server antenna port and the donor antenna port; an nth first-direction amplification and filtering path coupled between the server antenna port and the donor antenna port; a second-direction amplification and filtering path coupled between the server antenna port and the donor antenna port; an mth second-direction amplification and filtering path coupled between the server antenna port and the donor antenna port; a first-direction two-antenna radio frequency (RF) feedback cancellation circuit coupled between the server antenna port and the donor antenna port to reduce antenna-to-antenna feedback for n bands in a first direction between a donor antenna and a server antenna, wherein n is a positive integer greater than 0; and a second-direction two-antenna RF feedback cancellation circuit coupled between the server antenna port and the donor antenna port to reduce antenna-to-antenna feedback for m bands in a second direction between the donor antenna and the server antenna, wherein m is a positive integer greater than 0.

Example 16 includes the multiband repeater of Example 15, wherein one or more of the n first-direction amplification and filtering paths is configured to communicate two or more adjacent bands on a single path.

Example 17 includes the multiband repeater of any of Examples 15 to 16, wherein one or more of them second-direction amplification and filtering paths is configured to communicate two or more adjacent bands on a single path.

Example 18 includes the multiband repeater of any of Examples 15 to 17, wherein the two or more adjacent bands include 3GPP LTE downlink band 12 and downlink band 13.

Example 19 includes a multiband repeater comprising: a server antenna port; a donor antenna port; a first first-direction amplification and filtering path coupled between the server antenna port and the donor antenna port; an nth first-direction amplification and filtering path coupled between the server antenna port and the donor antenna port; a second-direction amplification and filtering path coupled between the server antenna port and the donor antenna port; an mth second-direction amplification and filtering path coupled between the server antenna port and the donor antenna port; a first multiplexer coupled between the server antenna port and the first amplification path and the second amplification path; a second multiplexer coupled between the donor antenna port and the first amplification path and the second amplification path; a first-direction two-antenna radio frequency (RF) feedback cancellation circuit coupled between the multiplexer and the second multiplexer to reduce antenna-to-antenna feedback for n bands in a first direction between a donor antenna and a server antenna, wherein n is a positive integer greater than 0; and a second-direction two-antenna RF feedback cancellation circuit coupled between the server antenna port and the donor antenna port to reduce antenna-to-antenna feedback for m bands in a second direction between the donor antenna and the server antenna, wherein m is a positive integer greater than 0.

Example 20 includes the multiband repeater of Example 19, wherein one or more of the n first-direction amplification and filtering paths is configured to communicate two or more adjacent bands Example 21 includes the multiband repeater of any of Examples 19 to 20, wherein one or more of the m second-direction amplification and filtering paths is configured to communicate two or more adjacent bands.

Example 22 includes the multiband repeater of any of Examples 19 to 21, wherein the two or more adjacent bands include 3GPP LTE downlink band 12 and downlink band 13.

Example 23 includes a multiband repeater comprising: a server antenna port; a donor antenna port; a first first-direction amplification and filtering path coupled between the server antenna port and the donor antenna port and configured to carry a first first-direction signal; a second first-direction amplification and filtering path coupled between the server antenna port and the donor antenna port and configured to carry a second first-direction signal; a second-direction amplification and filtering path coupled between the server antenna port and the donor antenna port and configured to carry a first second-direction signal and a second second-direction signal; a first-direction two-antenna radio frequency (RF) feedback cancellation circuit coupled between the server antenna port and the donor antenna port to reduce antenna-to-antenna feedback for the first first-direction signal in the first first-direction amplification and filtering path between a donor antenna and a server antenna; a second first-direction two-antenna radio frequency (RF) feedback cancellation circuit coupled between the server antenna port and the donor antenna port to reduce antenna-to-antenna feedback for the second first-direction signal in the second first-direction amplification and filtering path between a donor antenna and a server antenna; and a second-direction two-antenna RF feedback cancellation circuit coupled between the server antenna port and the donor antenna port to reduce antenna-to-antenna feedback for the first second-direction signal and the second second-direction signal in the second direction between the donor antenna and the server antenna.

Example 24 includes the multiband repeater of Example 23, wherein the first first-direction signal is a 3GPP LTE band 12 uplink signal, the second first-direction signal is a 3GPP LTE band 13 uplink signal, the first second-direction signal is a 3GPP LTE band 12 downlink signal, and the second second-direction signal is a 3GPP LTE band 13 downlink signal.

Example 25 includes a multiband repeater comprising: a server antenna port; a donor antenna port; a first first-direction amplification and filtering path coupled between the server antenna port and the donor antenna port; an nth first-direction amplification and filtering path coupled between the server antenna port and the donor antenna port; a first second-direction amplification and filtering path coupled between the server antenna port and the donor antenna port; an mth second-direction amplification and filtering path coupled between the server antenna port and the donor antenna port; a first first-direction two-antenna radio frequency (RF) feedback cancellation circuit coupled between the server antenna port and the donor antenna port to reduce antenna-to-antenna feedback for a first first-direction band in a first direction between a donor antenna and a server antenna; and a first second-direction two-antenna RF feedback cancellation circuit coupled between the server antenna port and the donor antenna port to reduce antenna-to-antenna feedback for a first second-direction band in a second direction between the donor antenna and the server antenna.

Example 26 includes the multiband repeater of Example 25, further comprising: an nth first-direction two-antenna radio frequency (RF) feedback cancellation circuit coupled between the server antenna port and the donor antenna port to reduce antenna-to-antenna feedback for an nth first-direction band in a first direction between a donor antenna and a server antenna; and an mth second-direction two-antenna RF feedback cancellation circuit coupled between the server antenna port and the donor antenna port to reduce antenna-to-antenna feedback for a mth second-direction band in a second direction between the donor antenna and the server antenna.

Example 27 includes the multiband repeater of any of Examples 25 to 26, further comprising: a first first-direction low noise amplifier (LNA) coupled between the first duplexer and the first first-direction two-antenna RF feedback cancellation circuit; a first first-direction power amplifier (PA) coupled between the second duplexer and the first first-direction LNA; wherein the first first-direction two-antenna RF feedback cancellation circuit is configured to sample a first-direction signal at an output of the first first-direction power amplifier and inject a first first-direction cancellation signal at an output of the first first-direction low-noise amplifier; a first second-direction low noise amplifier (LNA) coupled between the second duplexer and the first second-direction two-antenna RF feedback cancellation circuit; and a first second-direction power amplifier (PA) coupled between the first duplexer and the first second-direction LNA; wherein the first second-direction two-antenna RF feedback cancellation circuit is configured to sample a first second-direction signal at an output of the first second-direction power amplifier and inject a first second-direction cancellation signal at an output of the first second-direction low-noise amplifier.

Example 28 includes the multiband repeater of any of Examples 25 to 27, further comprising: an nth first-direction low noise amplifier (LNA) coupled between the first duplexer and an nth first-direction two-antenna RF feedback cancellation circuit; an nth first-direction power amplifier (PA) coupled between the second duplexer and the nth first-direction LNA; wherein an nth first-direction two-antenna RF feedback cancellation circuit is configured to sample an nth first-direction signal at an output of the nth first-direction power amplifier and inject an nth first-direction cancellation signal at an output of the nth first-direction low-noise amplifier; an mth second-direction low noise amplifier (LNA) coupled between the second duplexer and an mth second-direction two-antenna RF feedback cancellation circuit; and an mth second-direction power amplifier (PA) coupled between the first duplexer and the mth second-direction LNA; wherein the mth second-direction two-antenna RF feedback cancellation circuit is configured to sample an mth second-direction signal at an output of the mth second-direction power amplifier and inject an mth second-direction cancellation signal at an output of the mth second-direction low-noise amplifier.

Example 29 includes the multiband repeater of any of Examples 25 to 28, \wherein one or more of the n first-direction amplification and filtering paths is configured to communicate two or more adjacent bands on a single path.

Example 30 includes the multiband repeater of any of Examples 25 to 29, wherein one or more of the m second-direction amplification and filtering paths is configured to communicate two or more adjacent bands on a single path.

Example 31 includes the multiband repeater of any of Examples 25 to 30, wherein the two or more adjacent bands include 3GPP LTE downlink band 12 and downlink band 13.

Example 32 includes the multiband repeater of any of Examples 25 to 31, wherein the two or more adjacent bands include 3GPP LTE downlink band 12 and downlink band 13.

Example 33 includes a repeater comprising: a server antenna port; a donor antenna port; a first-direction amplification and filtering path for a first-direction signal, wherein the first-direction amplification and filtering path is coupled between the server antenna port and the donor antenna port; a second-direction amplification and filtering path for a second-direction signal, wherein the second-direction amplification and filtering path is coupled between the server antenna port and the donor antenna port; a first-direction channel cancellation circuit coupled between the server antenna port and the donor antenna port to reduce an amplitude of a first-direction selected channel in the first-direction signal; and a second-direction channel cancellation circuit coupled between the server antenna port and the donor antenna port to reduce an amplitude of a second-direction selected channel in the second-direction signal.

Example 34 includes the multiband repeater of Examples 33, further comprising: a first duplexer coupled between the server antenna port and the first amplification path and the second amplification path; and a second duplexer coupled between the donor antenna port and the first amplification path and the second amplification path.

Example 35 includes the multiband repeater of any of Examples 33 to 34, further comprising: a first-direction low-noise amplifier coupled to the first duplexer; a second-direction low-noise amplifier coupled to the second duplexer; a first-direction power amplifier coupled to a port of the second duplexer on the first amplification path; and a second-direction power amplifier coupled to a port of the first duplexer on the second amplification path.

Example 36 includes the multiband repeater of any of Examples 33 to 35, further comprising: a first bandpass filter coupled to an output of the first-direction low noise amplifier, wherein the first bandpass filter is configured to output a first-direction band signal comprising a plurality of first-direction channels; and a second bandpass filter coupled to an output of the second-direction low noise amplifier, wherein the second bandpass filter is configured to output a second-direction band signal comprising a plurality of second-direction channels.

Example 37 includes the multiband repeater of any of Examples 33 to 36, wherein the first-direction channel cancellation circuit is configured to: couple the first-direction band signal output from the first bandpass filter; couple one or more selected channels of the plurality of first-direction channels; and inject a first-direction channel cancellation signal into the first-direction band signal to reduce the amplitude of the one or more selected channels to form a first-direction channelized signal.

Example 38 includes the multiband repeater of any of Examples 33 to 37, wherein the second-direction channel cancellation circuit is configured to: couple the second-direction band signal output from the second bandpass filter; couple one or more selected channels of the plurality of second-direction channels; and inject a second-direction channel cancellation signal into the second-direction band signal to reduce the amplitude of the one or more selected channels to form a second-direction channelized signal.

Example 39 includes the multiband repeater of any of Examples 33 to 38, further comprising: a first-direction signal delay located between the coupling of the first-direction band signal and the injection of the first-direction channel cancellation signal; and a second-direction signal delay located between the coupling of the second-direction band signal and the injection of the second-direction channel cancellation signal.

Example 40 includes the multiband repeater of any of Examples 33 to 39, wherein the amplitude of the first-direction selected channel is reduced by greater than 20 decibels (dB) or wherein the amplitude of the second-direction selected channel is reduced by greater than 20 dB.

Example 41 includes the multiband repeater of any of Examples 33 to 40, wherein the amplitude of the first-direction selected channel is greater than an amplitude of other channels in the first-direction signal.

Example 42 includes the multiband repeater of any of Examples 33 to 41, wherein the amplitude of the second-direction selected channel is greater than an amplitude of other channels in the second-direction signal.

Example 43 includes a repeater comprising: a server antenna port; a donor antenna port; a first-direction amplification and filtering path for a first-direction signal, wherein the first-direction amplification and filtering path is coupled between the server antenna port and the donor antenna port; a second-direction amplification and filtering path for a second-direction signal, wherein the second-direction amplification and filtering path is coupled between the server antenna port and the donor antenna port; a first-direction channel cancellation circuit coupled between the server antenna port and the donor antenna port to reduce an amplitude of a first-direction selected channel in the first-direction signal; and a second-direction channel cancellation circuit coupled between the server antenna port and the donor antenna port to reduce an amplitude of a second-direction selected channel in the second-direction signal.

Example 44 includes the repeater of Example 43, further comprising: a first duplexer coupled between the server antenna port and the first amplification path and the second amplification path; and a second duplexer coupled between the donor antenna port and the first amplification path and the second amplification path.

Example 45 includes the repeater of Example 44, further comprising: a first-direction low-noise amplifier coupled to the first duplexer; a second-direction low-noise amplifier coupled to the second duplexer; a first-direction power amplifier coupled to a port of the second duplexer on the first amplification path; and a second-direction power amplifier coupled to a port of the first duplexer on the second amplification path.

Example 46 includes the repeater of Example 45, further comprising: a first bandpass filter coupled to an output of the first-direction low noise amplifier, wherein the first bandpass filter is configured to output a first-direction band signal comprising a plurality of first-direction channels; and a second bandpass filter coupled to an output of the second-direction low noise amplifier, wherein the second bandpass filter is configured to output a second-direction band signal comprising a plurality of second-direction channels.

Example 47 includes the repeater of Example 46, wherein the first-direction channel cancellation circuit is configured to: couple the first-direction band signal output from the first bandpass filter; couple one or more selected channels of the plurality of first-direction channels; and inject a first-direction channel cancellation signal into the first-direction band signal to reduce the amplitude of the one or more selected channels to form a first-direction channelized signal.

Example 48 includes the repeater of Example 46, wherein the second-direction channel cancellation circuit is configured to: couple the second-direction band signal output from the second bandpass filter; couple one or more selected channels of the plurality of second-direction channels; and inject a second-direction channel cancellation signal into the second-direction band signal to reduce the amplitude of the one or more selected channels to form a second-direction channelized signal.

Example 49 includes the repeater of Example 47, further comprising a first-direction signal delay located between the coupling of the first-direction band signal and the injection of the first-direction channel cancellation signal.

Example 50 includes the repeater of Example 48, further comprising a second-direction signal delay located between the coupling of the second-direction band signal and the injection of the second-direction channel cancellation signal.

Example 51 includes the repeater of Example 43, wherein: the amplitude of the first-direction selected channel is reduced by greater than 20 decibels (dB); the amplitude of the second-direction selected channel is reduced by greater than 20 dB; the amplitude of the first-direction selected channel is reduced by greater than 30 dB; or the amplitude of the second-direction selected channel is reduced by greater than 30 dB.

Example 52 includes the repeater of Example 43, wherein: the amplitude of the first-direction selected channel is greater than an amplitude of other channels in the first-direction signal; or the amplitude of the second-direction selected channel is greater than an amplitude of other channels in the second-direction signal.

Example 53 includes a repeater comprising: a server antenna port; a donor antenna port; a first first-direction amplification and filtering path for a first first-direction signal coupled between the server antenna port and the donor antenna port; a first second-direction amplification and filtering path for a first second-direction signal coupled between the server antenna port and the donor antenna port; an nth first-direction amplification and filtering path coupled between the server antenna port and the donor antenna port, wherein n is an integer greater than or equal to 0, an mth first-direction amplification and filtering path coupled between the server antenna port and the donor antenna port, wherein m is an integer greater than or equal to 0, a first-direction channel cancellation circuit coupled between the server antenna port and the donor antenna port to reduce an amplitude of a first-direction selected channel in the first-direction signal; and a second-direction channel cancellation circuit coupled between the server antenna port and the donor antenna port to reduce an amplitude of a second-direction selected channel in the second-direction signal.

Example 54 includes the repeater of Example 53, further comprising: a first multiplexer coupled between the server antenna port and the first first-direction amplification and filtering path and the first second-direction amplification and filtering path; and a second multiplexer coupled between the donor antenna port and the first first-direction amplification and filtering path and the first second-direction amplification and filtering path.

Example 55 includes the repeater of Example 54, further comprising: a first-direction low-noise amplifier coupled to the first multiplexer; a second-direction low-noise amplifier coupled to the second multiplexer; a first-direction power amplifier coupled to a port of the second multiplexer on the first first-direction amplification and filtering path; and a second-direction power amplifier coupled to a port of the first multiplexer on the first second-direction amplification and filtering path.

Example 56 includes the repeater of Example 55, further comprising: a first bandpass filter coupled to an output of the first-direction low noise amplifier, wherein the first bandpass filter is configured to output a first-direction band signal comprising a plurality of first-direction channels; and a second bandpass filter coupled to an output of the second-direction low noise amplifier, wherein the second bandpass filter is configured to output a second-direction band signal comprising a plurality of second-direction channels.

Example 57 includes the repeater of Example 56, wherein the first-direction channel cancellation circuit is configured to: couple the first-direction band signal output from the first bandpass filter; couple one or more selected channels of the plurality of first-direction channels; and inject a first-direction channel cancellation signal into the first-direction band signal to reduce the amplitude of the one or more selected channels to form a first-direction channelized signal.

Example 58 includes the repeater of Example 56, wherein the second-direction channel cancellation circuit is configured to: couple the second-direction band signal output from the second bandpass filter; couple one or more selected channels of the plurality of second-direction channels; and inject a second-direction channel cancellation signal into the second-direction band signal to reduce the amplitude of the one or more selected channels to form a second-direction channelized signal.

Example 59 includes the repeater of Example 57, further comprising a first-direction signal delay located between the coupling of the first-direction band signal and the injection of the first-direction channel cancellation signal.

Example 60 includes the repeater of Example 58, further comprising a second-direction signal delay located between the coupling of the second-direction band signal and the injection of the second-direction channel cancellation signal.

Example 61 includes the repeater of Example 53, wherein: the amplitude of the first-direction selected channel is reduced by greater than 20 decibels (dB); the amplitude of the second-direction selected channel is reduced by greater than 20 dB; the amplitude of the first-direction selected channel is reduced by greater than 30 dB; or the amplitude of the second-direction selected channel is reduced by greater than 30 dB.

Example 62 includes the repeater of Example 53, wherein: the amplitude of the first-direction selected channel is greater than an amplitude of other channels in the first-direction signal; or the amplitude of the second-direction selected channel is greater than an amplitude of other channels in the second-direction signal.

Example 63 includes a repeater comprising: a server antenna port; a donor antenna port; a first-direction amplification and filtering path coupled between the server antenna port and the donor antenna port; a second-direction amplification and filtering path coupled between the server antenna port and the donor antenna port; a first-direction channel cancellation circuit coupled between the server antenna port and the donor antenna port to reduce an amplitude of a first-direction selected channel in a time division duplex (TDD) signal; and a second-direction channel cancellation circuit coupled between the server antenna port and the donor antenna port to reduce an amplitude of a second-direction selected channel in the TDD signal.

Example 64 includes the repeater of Example 63, further comprising: a first bandpass filter coupled to an output of a first-direction low noise amplifier, wherein the first bandpass filter is configured to output the TDD signal comprising a plurality of first-direction channels; and a second bandpass filter coupled to an output of a second-direction low noise amplifier, wherein the second bandpass filter is configured to output the TDD signal comprising a plurality of second-direction channels.

Example 65 includes the repeater of Example 64, wherein the first-direction channel cancellation circuit is configured to: couple the TDD signal output from the first bandpass filter; couple one or more selected channels of the plurality of first-direction channels; and inject a first-direction channel cancellation signal into the TDD signal to reduce the amplitude of the one or more selected channels to form a first-direction channelized TDD signal.

Example 66 includes the repeater of Example 64, wherein the second-direction channel cancellation circuit is configured to: couple the TDD signal output from the second bandpass filter; couple one or more selected channels of the plurality of second-direction channels; and inject a second-direction channel cancellation signal into the TDD signal to reduce the amplitude of the one or more selected channels to form a second-direction channelized TDD signal.

Example 67 includes the repeater of Example 65, further comprising a first-direction signal delay located between the coupling of the TDD signal and the injection of the first-direction channel cancellation signal.

Example 68 includes the repeater of Example 66, further comprising a second-direction signal delay located between the coupling of the TDD signal and the injection of the second-direction channel cancellation signal.

Example 69 includes the repeater of Example 63, wherein: the amplitude of the first-direction selected channel is reduced by greater than 20 decibels (dB); the amplitude of the second-direction selected channel is reduced by greater than 20 dB; the amplitude of the first-direction selected channel is reduced by greater than 30 dB; or the amplitude of the second-direction selected channel is reduced by greater than 30 dB.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater comprising:
a server antenna port;
a donor antenna port;
a first-direction amplification and filtering path for a first-direction signal, wherein the first-direction amplification and filtering path is coupled between the server antenna port and the donor antenna port;
a second-direction amplification and filtering path for a second-direction signal, wherein the second-direction amplification and filtering path is coupled between the server antenna port and the donor antenna port;
a first-direction channel cancellation circuit coupled between the server antenna port and the donor antenna port to reduce an amplitude of a first-direction selected channel in the first-direction signal; and
a second-direction channel cancellation circuit coupled between the server antenna port and the donor antenna port to reduce an amplitude of a second-direction selected channel in the second-direction signal.

2. The repeater of claim 1, further comprising:
a first duplexer coupled between the server antenna port and the first amplification path and the second amplification path; and
a second duplexer coupled between the donor antenna port and the first amplification path and the second amplification path.

3. The repeater of claim 2, further comprising:
a first-direction low-noise amplifier coupled to the first duplexer;
a second-direction low-noise amplifier coupled to the second duplexer;
a first-direction power amplifier coupled to a port of the second duplexer on the first amplification path; and
a second-direction power amplifier coupled to a port of the first duplexer on the second amplification path.

4. The repeater of claim 3, further comprising:
a first bandpass filter coupled to an output of the first-direction low noise amplifier, wherein the first bandpass filter is configured to output a first-direction band signal comprising a plurality of first-direction channels; and a second bandpass filter coupled to an output of the second-direction low noise amplifier, wherein the second bandpass filter is configured to output a second-direction band signal comprising a plurality of second-direction channels.

5. The repeater of claim 4, wherein the first-direction channel cancellation circuit is configured to:
   couple the first-direction band signal output from the first bandpass filter;
   couple one or more selected channels of the plurality of first-direction channels; and
   inject a first-direction channel cancellation signal into the first-direction band signal to reduce the amplitude of the one or more selected channels to form a first-direction channelized signal.

6. The repeater of claim 4, wherein the second-direction channel cancellation circuit is configured to:
   couple the second-direction band signal output from the second bandpass filter;
   couple one or more selected channels of the plurality of second-direction channels; and
   inject a second-direction channel cancellation signal into the second-direction band signal to reduce the amplitude of the one or more selected channels to form a second-direction channelized signal.

7. The repeater of claim 5, further comprising a first-direction signal delay located between the coupling of the first-direction band signal and the injection of the first-direction channel cancellation signal.

8. The repeater of claim 6, further comprising a second-direction signal delay located between the coupling of the second-direction band signal and the injection of the second-direction channel cancellation signal.

9. The repeater of claim 1, wherein:
   the amplitude of the first-direction selected channel is reduced by greater than 20 decibels (dB);
   the amplitude of the second-direction selected channel is reduced by greater than 20 dB;
   the amplitude of the first-direction selected channel is reduced by greater than 30 dB; or
   the amplitude of the second-direction selected channel is reduced by greater than 30 dB.

10. The repeater of claim 1, wherein:
    the amplitude of the first-direction selected channel is greater than an amplitude of other channels in the first-direction signal; or
    the amplitude of the second-direction selected channel is greater than an amplitude of other channels in the second-direction signal.

11. A repeater comprising:
    a server antenna port;
    a donor antenna port;
    a first first-direction amplification and filtering path for a first first-direction signal coupled between the server antenna port and the donor antenna port;
    a first second-direction amplification and filtering path for a first second-direction signal coupled between the server antenna port and the donor antenna port;
    an nth first-direction amplification and filtering path coupled between the server antenna port and the donor antenna port, wherein n is an integer greater than or equal to 0,
    an mth first-direction amplification and filtering path coupled between the server antenna port and the donor antenna port, wherein m is an integer greater than or equal to 0,
    a first-direction channel cancellation circuit coupled between the server antenna port and the donor antenna port to reduce an amplitude of a first-direction selected channel in the first-direction signal; and
    a second-direction channel cancellation circuit coupled between the server antenna port and the donor antenna port to reduce an amplitude of a second-direction selected channel in the second-direction signal.

12. The repeater of claim 11, further comprising:
    a first multiplexer coupled between the server antenna port and the first first-direction amplification and filtering path and the first second-direction amplification and filtering path; and
    a second multiplexer coupled between the donor antenna port and the first first-direction amplification and filtering path and the first second-direction amplification and filtering path.

13. The repeater of claim 12, further comprising:
    a first-direction low-noise amplifier coupled to the first multiplexer;
    a second-direction low-noise amplifier coupled to the second multiplexer;
    a first-direction power amplifier coupled to a port of the second multiplexer on the first first-direction amplification and filtering path; and
    a second-direction power amplifier coupled to a port of the first multiplexer on the first second-direction amplification and filtering path.

14. The repeater of claim 13, further comprising:
    a first bandpass filter coupled to an output of the first-direction low noise amplifier, wherein the first bandpass filter is configured to output a first-direction band signal comprising a plurality of first-direction channels; and
    a second bandpass filter coupled to an output of the second-direction low noise amplifier, wherein the second bandpass filter is configured to output a second-direction band signal comprising a plurality of second-direction channels.

15. The repeater of claim 14, wherein the first-direction channel cancellation circuit is configured to:
    couple the first-direction band signal output from the first bandpass filter;
    couple one or more selected channels of the plurality of first-direction channels; and
    inject a first-direction channel cancellation signal into the first-direction band signal to reduce the amplitude of the one or more selected channels to form a first-direction channelized signal.

16. The repeater of claim 14, wherein the second-direction channel cancellation circuit is configured to:
    couple the second-direction band signal output from the second bandpass filter;
    couple one or more selected channels of the plurality of second-direction channels; and
    inject a second-direction channel cancellation signal into the second-direction band signal to reduce the amplitude of the one or more selected channels to form a second-direction channelized signal.

17. The repeater of claim 15, further comprising a first-direction signal delay located between the coupling of the first-direction band signal and the injection of the first-direction channel cancellation signal.

18. The repeater of claim 16, further comprising a second-direction signal delay located between the coupling of the second-direction band signal and the injection of the second-direction channel cancellation signal.

19. The repeater of claim 11, wherein:

the amplitude of the first-direction selected channel is reduced by greater than 20 decibels (dB);

the amplitude of the second-direction selected channel is reduced by greater than 20 dB;

the amplitude of the first-direction selected channel is reduced by greater than 30 dB; or the amplitude of the second-direction selected channel is reduced by greater than 30 dB.

20. The repeater of claim 11, wherein:

the amplitude of the first-direction selected channel is greater than an amplitude of other channels in the first-direction signal; or the amplitude of the second-direction selected channel is greater than an amplitude of other channels in the second-direction signal.

21. A repeater comprising:

a server antenna port;

a donor antenna port;

a first-direction amplification and filtering path coupled between the server antenna port and the donor antenna port;

a second-direction amplification and filtering path coupled between the server antenna port and the donor antenna port;

a first-direction channel cancellation circuit coupled between the server antenna port and the donor antenna port to reduce an amplitude of a first-direction selected channel in a time division duplex (TDD) signal; and a second-direction channel cancellation circuit coupled between the server antenna port and the donor antenna port to reduce an amplitude of a second-direction selected channel in the TDD signal.

22. The repeater of claim 21, further comprising:

a first bandpass filter coupled to an output of a first-direction low noise amplifier, wherein the first bandpass filter is configured to output the TDD signal comprising a plurality of first-direction channels; and a second bandpass filter coupled to an output of a second-direction low noise amplifier, wherein the second bandpass filter is configured to output the TDD signal comprising a plurality of second-direction channels.

23. The repeater of claim 22, wherein the first-direction channel cancellation circuit is configured to:

couple the TDD signal output from the first bandpass filter;

couple one or more selected channels of the plurality of first-direction channels; and inject a first-direction channel cancellation signal into the TDD signal to reduce the amplitude of the one or more selected channels to form a first-direction channelized TDD signal.

24. The repeater of claim 22, wherein the second-direction channel cancellation circuit is configured to:

couple the TDD signal output from the second bandpass filter;

couple one or more selected channels of the plurality of second-direction channels; and inject a second-direction channel cancellation signal into the TDD signal to reduce the amplitude of the one or more selected channels to form a second-direction channelized TDD signal.

25. The repeater of claim 23, further comprising a first-direction signal delay located between the coupling of the TDD signal and the injection of the first-direction channel cancellation signal.

26. The repeater of claim 24, further comprising a second-direction signal delay located between the coupling of the TDD signal and the injection of the second-direction channel cancellation signal.

27. The repeater of claim 21, wherein:

the amplitude of the first-direction selected channel is reduced by greater than 20 decibels (dB);

the amplitude of the second-direction selected channel is reduced by greater than 20 dB;

the amplitude of the first-direction selected channel is reduced by greater than 30 dB; or the amplitude of the second-direction selected channel is reduced by greater than 30 dB.

\* \* \* \* \*